(12) United States Patent
Sawada et al.

(10) Patent No.: US 11,196,882 B2
(45) Date of Patent: Dec. 7, 2021

(54) IMAGE FORMING APPARATUS ON WHICH CARD READER IS MOUNTABLE

(71) Applicant: CANON KABUSHIKI KAISHA, Tokyo (JP)

(72) Inventors: Hirohisa Sawada, Chiba (JP); Shingo Hattori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/075,777

(22) Filed: Oct. 21, 2020

(65) Prior Publication Data

US 2021/0160388 A1   May 27, 2021

(30) Foreign Application Priority Data

Nov. 21, 2019  (JP) .............................. JP2019-210866

(51) Int. Cl.
| | | |
|---|---|---|
| *H04N 1/00* | (2006.01) | |
| *H04N 1/23* | (2006.01) | |
| *G06K 7/00* | (2006.01) | |
| *C09J 7/00* | (2018.01) | |

(52) U.S. Cl.
CPC ............ *H04N 1/00538* (2013.01); *C09J 7/00* (2013.01); *G06K 7/0013* (2013.01); *H04N 1/00551* (2013.01); *H04N 1/00557* (2013.01); *H04N 1/00559* (2013.01); *H04N 1/2392* (2013.01); *C09J 2301/124* (2020.08); *H04N 1/0049* (2013.01)

(58) Field of Classification Search
None
See application file for complete search history.

(56) References Cited

U.S. PATENT DOCUMENTS

| | | | |
|---|---|---|---|
| 6,115,034 A | 9/2000 | Tanaka et al. | |
| 9,794,438 B2 | 10/2017 | Sawada | |
| 10,033,889 B2 | 7/2018 | Sawada | |
| 10,291,803 B2 | 5/2019 | Sawada | |
| 2016/0289019 A1* | 10/2016 | Kuroki | ................... B65H 1/266 |
| 2017/0180573 A1 | 6/2017 | Kuroki et al. | |
| 2019/0086057 A1* | 3/2019 | Kim | ....................... F21V 29/70 |

(Continued)

FOREIGN PATENT DOCUMENTS

| | | |
|---|---|---|
| JP | 2004-202911 A | 7/2004 |
| JP | 2016-186657 A | 10/2016 |

(Continued)

OTHER PUBLICATIONS

Copending U.S. Appl. No. 17/156,726, filed Jan. 25, 2021.

*Primary Examiner* — Miya J Williams
(74) *Attorney, Agent, or Firm* — Venable LLP

(57) ABSTRACT

An image forming apparatus includes an image forming portion configured to form an image on a sheet; a mounting portion on which an IC card reader which includes a lighting portion where light indicating an operation state comes on and which is used for user authentication is mounted; a reader cover mounted on the mounting portion and covering the IC card reader, wherein the reader cover is provided with a plurality of openings, either one of the openings opposing the lighting portion of the IC card reader; and a light transmission sheet provided on the reader cover and covering the openings, wherein transmittance of visible light for the light transmission sheet is 5% or more and 25% or less.

16 Claims, 14 Drawing Sheets

| No. | 1 | 2 | 3 | 4 | 5 |
|---|---|---|---|---|---|
| COMPANY NAME | A | B | C | D | E |
| TOP SURFACE SHAPE | FLAT | FLAT | FLAT | 凹凸 | 凹凸 |
| MOUNTING METHOD | TAPE+SPONGE | TAPE+SPONGE | TAPE+SPONGE | SPONGE | SPONGE |
| SIZE W[mm] × D[mm] × H[mm] | 54 × 75 × 10 | 64 × 98 × 13 | 60 × 97 × 13.5 | 50 × 90 × 15 | 77 × 77 × 20 |
| PLACE OF LIGHTING PORTION | | | | | |
| COVER PORTION | | | | | |

(56) References Cited

U.S. PATENT DOCUMENTS

2020/0110308 A1    4/2020   Hattori et al.
2020/0153985 A1    5/2020   Sawada
2020/0249888 A1*   8/2020   Kurita ................ H04N 1/00411

FOREIGN PATENT DOCUMENTS

JP        2016-163233  A1    4/2017
JP            6264471  B     1/2018

* cited by examiner (a)

(b)

| No. | 1 | 2 | 3 | 4 | 5 |
|---|---|---|---|---|---|
| COMPANY NAME | A | B | C | D | E |
| TOP SURFACE SHAPE | FLAT | FLAT | FLAT | 凹凸 | 凹凸 |
| MOUNTING METHOD | TAPE+SPONGE | TAPE+SPONGE | TAPE+SPONGE | SPONGE | SPONGE |
| SIZE W[mm]×D[mm]×H[mm] | 54×75×10 | 64×98×13 | 60×97×13.5 | 50×90×15 | 77×77×20 |
| PLACE OF LIGHTING PORTION | | | | | |
| COVER PORTION | | | | | |

IMAGE FORMING APPARATUS ON WHICH CARD READER IS MOUNTABLE

FIELD OF THE INVENTION AND RELATED ART

The present invention relates to an image forming apparatus provided with a card reader or the like for reading information from an IC card.

On the image forming apparatus such as a printer or a copying machine, an IC card reader capable of reading user information from the IC card is provided in some instances. The IC card reader include a lamp for notifying a user of an operation status of the IC card in some instances. In the case where the user holds the IC card over the IC card reader, the lamp notifies the user of whether or not data communication ends, by a color or lighting pattern thereof.

On a front side of an image forming apparatus disclosed in Japanese Patent 6264471, a holder for the IC card reader is formed, and the IC card reader is accommodated in this holder. The IC card reader and the holder are covered by mounting a cover on the image forming apparatus. Further, the IC card reader is provided with a lighting portion such as an LED used for displaying an operating state of the IC card reader. The cover has a light transmission property, and a lighting state of the lighting portion is visible from an outside thereof through the cover.

Various kinds of authentication terminals such as the IC card reader exist, and a place where the lighting portion is provided is different depending on the authentication terminals in some cases. Therefore, a holder for the authentication terminals as shown in FIG. 15 has been known. This holder includes a casing 134, a cover 136, and a sheet material 136a. In the casing 134, the authentication terminal such as the IC card reader is accommodated and covered with the cover 136. The cover 136 is provided with a plurality of openings 136b1 to 136b3. Of these openings 136b1 to b3, either one is opposed to a lighting portion 161 of the authentication terminal accommodated in the casing 134. That is, for example, even in the case where a certain authentication terminal and another authentication terminal are different in place where the lighting portion is provided, the cover 136 is provided with the opening so as to be opposed to the lighting portion. Further, onto the cover 136, the sheet material 136a is applied. Of the sheet material 136a, a portion corresponding to the lighting portion 161 is transparent. By this, light of the lighting portion 161 is emitted to an outside of the cover 136 through a transparent portion of the sheet material 136a.

Here, in a constitution in which the cover of the holder is covered with the sheet material partially including a transparent region (portion) as described above with reference to FIG. 15, in the case where the position of the lighting portion is different depending on the IC card reader used, there is a need to change a position of the transparent region formed in the sheet material, depending on the position of the lighting portion. For that reason, there is a need that sheet materials of different kinds are prepared and are changed depending on the position of the lighting portion. As a method of overcoming (eliminating) a trouble and cost disadvantage for preparing the sheet materials of different kinds, there is a method in which a light transmittance of an entire area of the sheet material shown in FIG. 15 is made high as in the case of the transparent cover disclosed in Japanese Patent 6264471.

However, in the case where the sheet material high in transmittance is applied onto the cover of the holder, most of light reflected by edges of the plurality of openings formed in the cover is transparent to the sheet material, so that these openings are conspicuous. For that reason, a quality of outer appearance lowers.

SUMMARY OF THE INVENTION

According to an aspect of the present invention, there is provided an image forming apparatus comprising: an image forming portion configured to form an image on a sheet; a mounting portion on which an IC card reader which includes a lighting portion where light indicating an operation state comes on and which is used for user authentication is mounted; a reader cover mounted on the mounting portion and covering the IC card reader, wherein the reader cover is provided with a plurality of openings, either one of the openings opposing the lighting portion of the IC card reader; and a light transmission sheet provided o the reader cover and covering the openings, wherein transmittance of visible light for the light transmission sheet is 5% or more and 25% or less.

Further features of the present invention will become apparent from the following description of exemplary embodiments with reference to the attached drawings.

Figure 7:
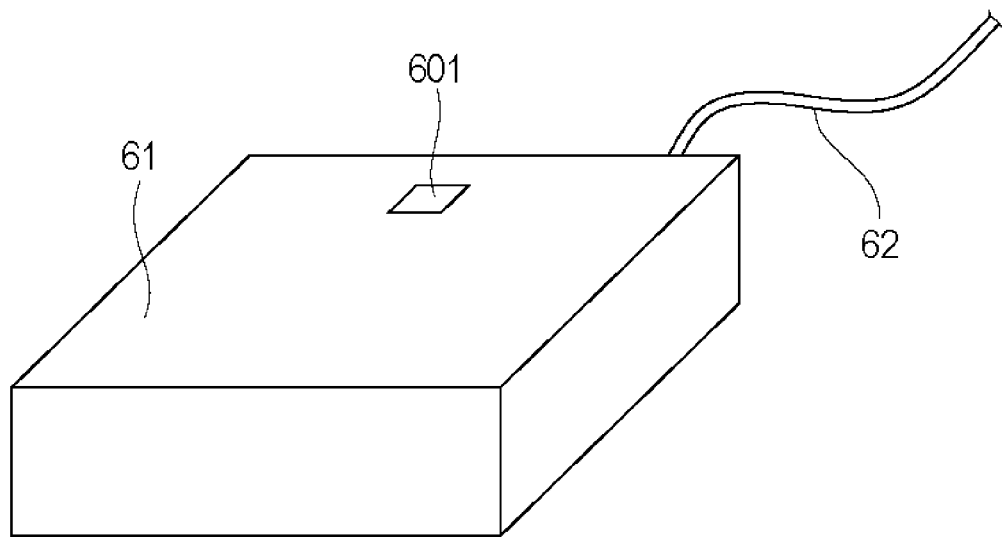
Figure 7:
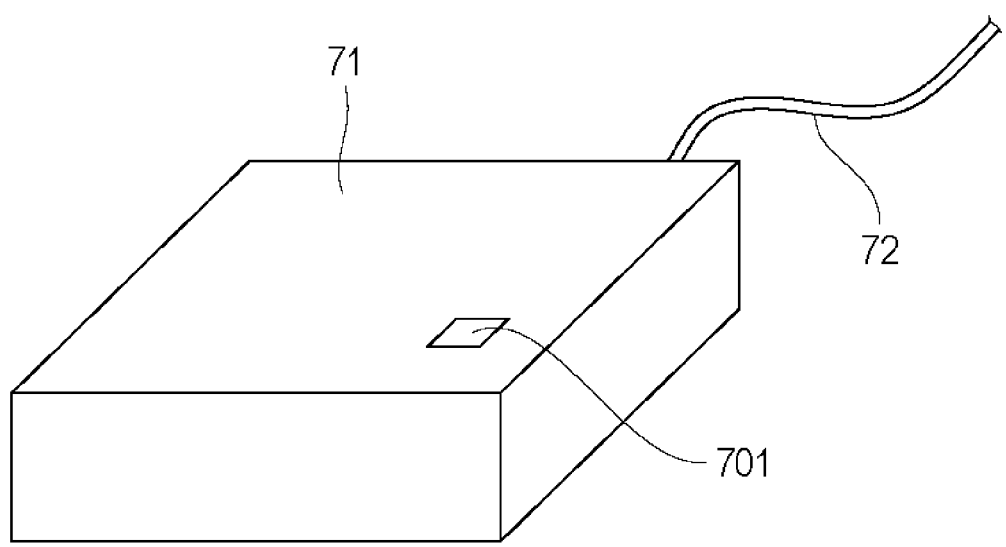

Parts (a) and (b) of FIG. 7 are schematic views for illustrating IC card readers different in place where a lighting portion is provided.

FIG. 8 is an example of IC card readers mountable on the image forming apparatus according to an embodiment of the present invention.

Figure 9:
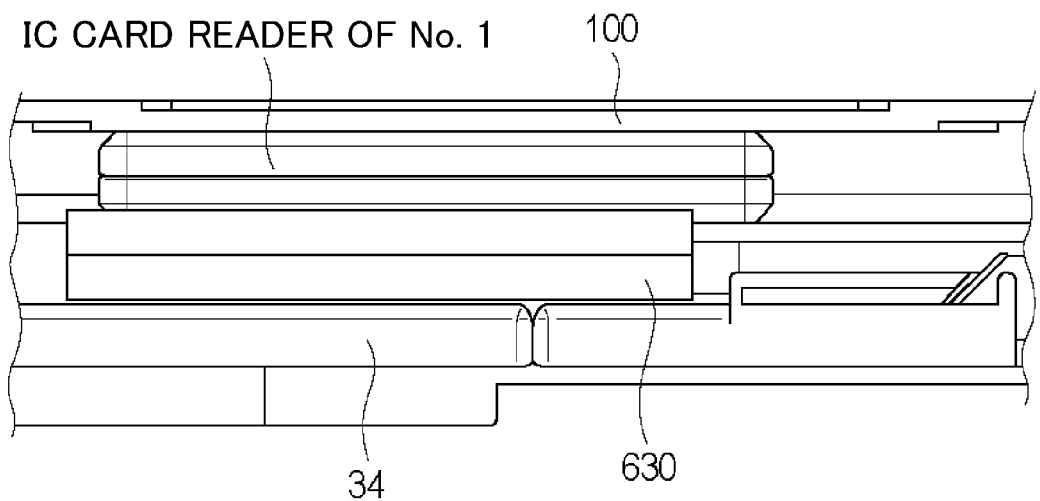
Figure 9:
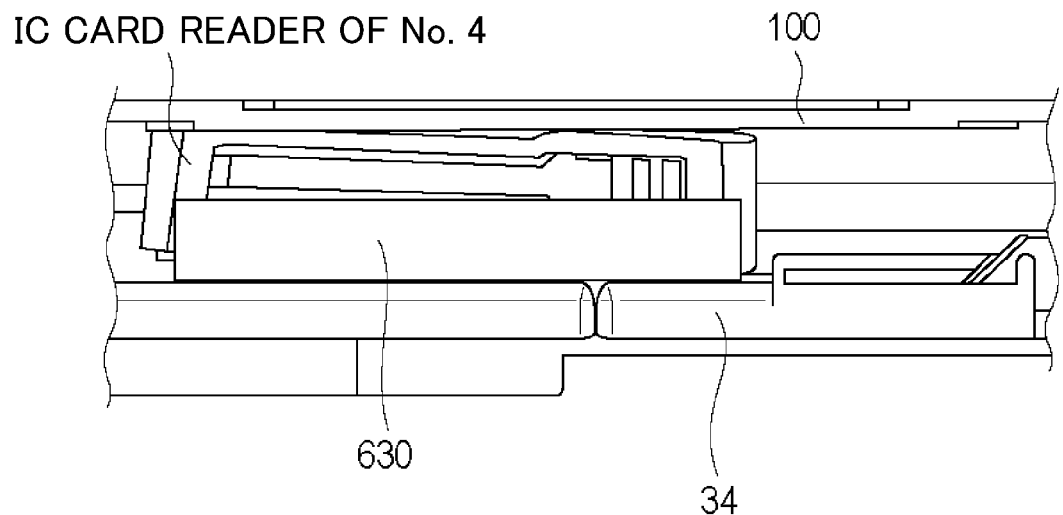

Parts (a) and (b) of FIG. 9 each for illustrating a mounting method of an IC card reader on a mounting portion.

Figure 10:
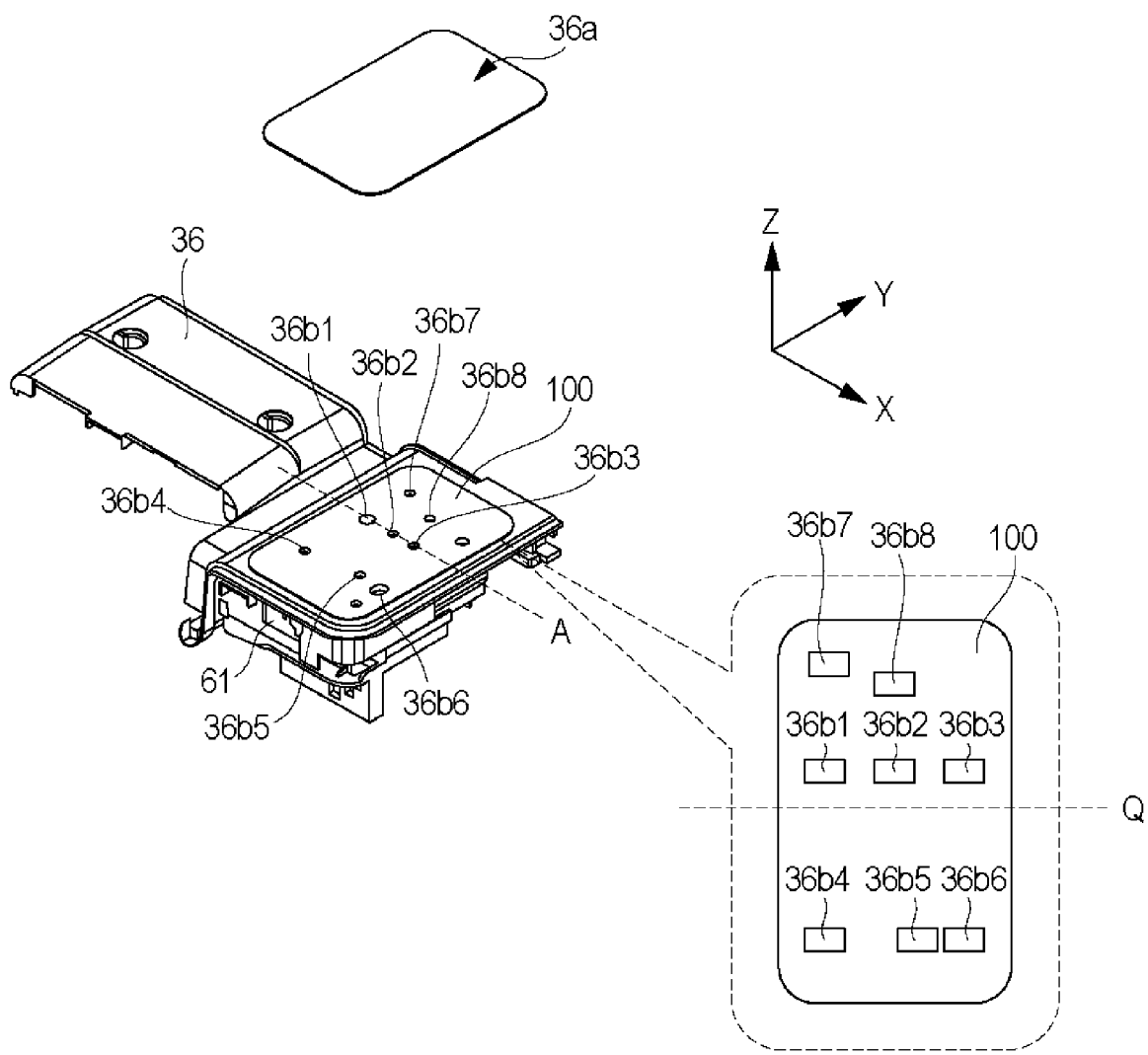

FIG. 10 is a schematic view for illustrating a cover portion in a state in which a sheet material is removed.

Figure 11:
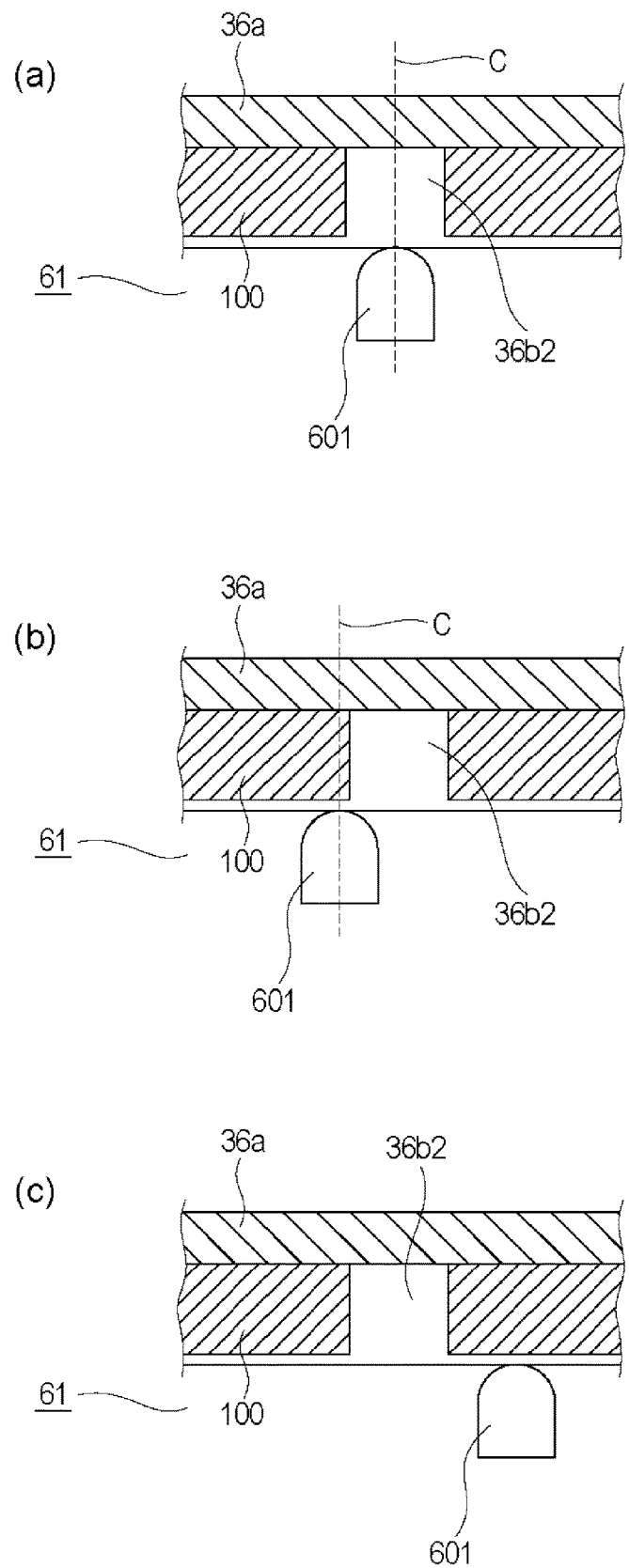

Parts (a), (b) and (c) of FIG. 11 are schematic views each for illustrating a positional relationship between a cover portion and a lighting portion of the IC card reader.

Figure 12:
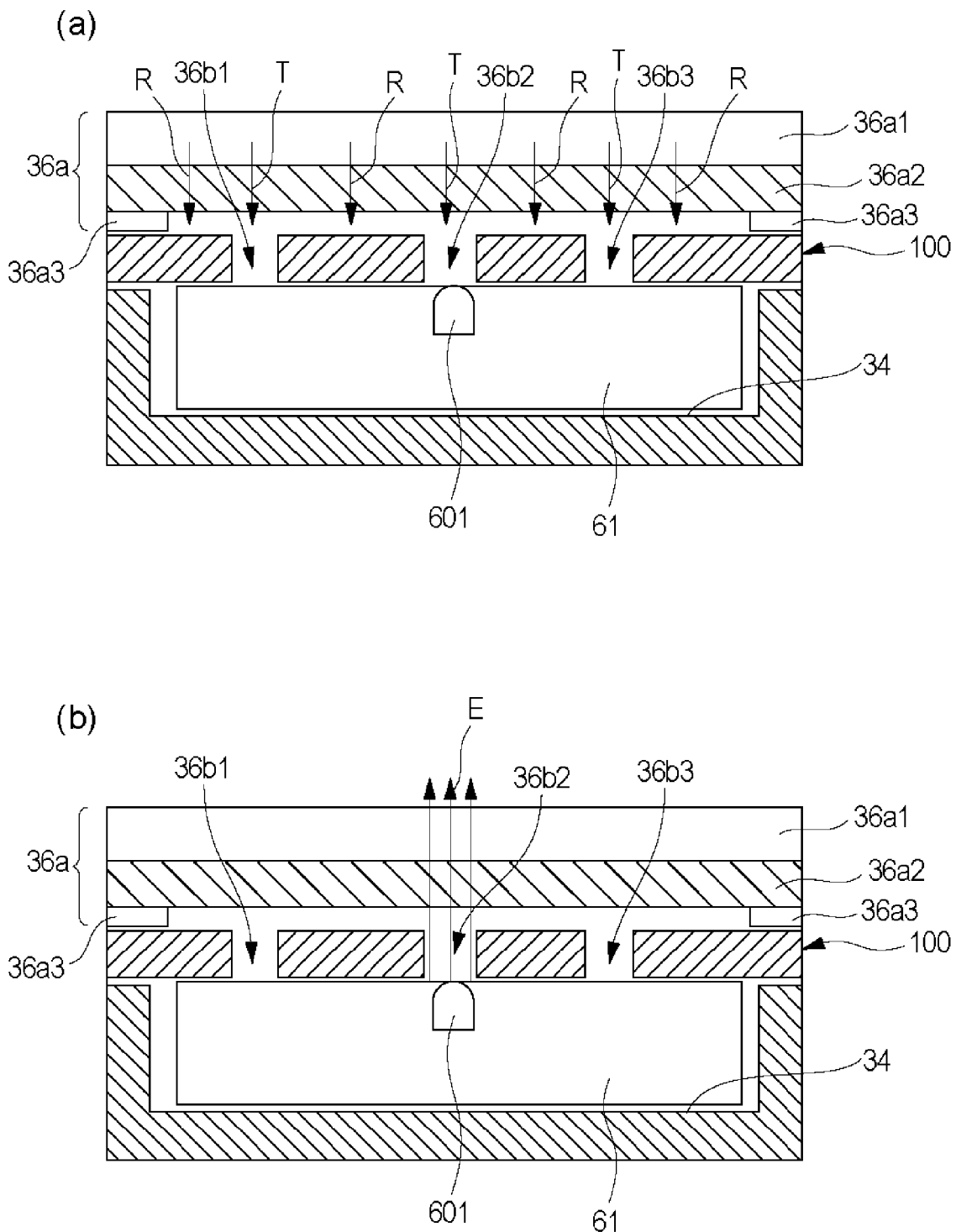

Parts (a) and (b) of FIG. 12 are schematic views for illustrating an effect of the sheet material.

Figure 13:
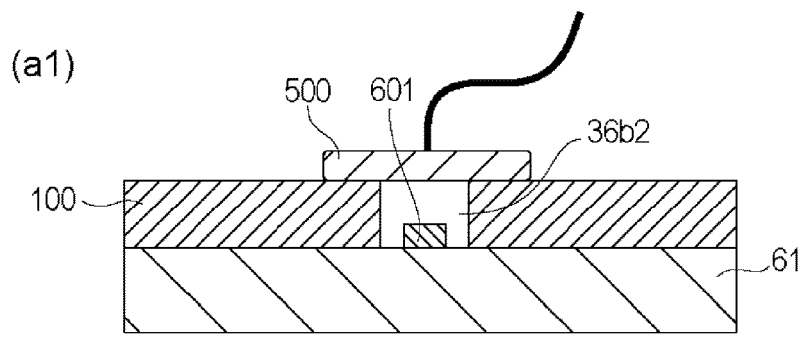
Figure 13:
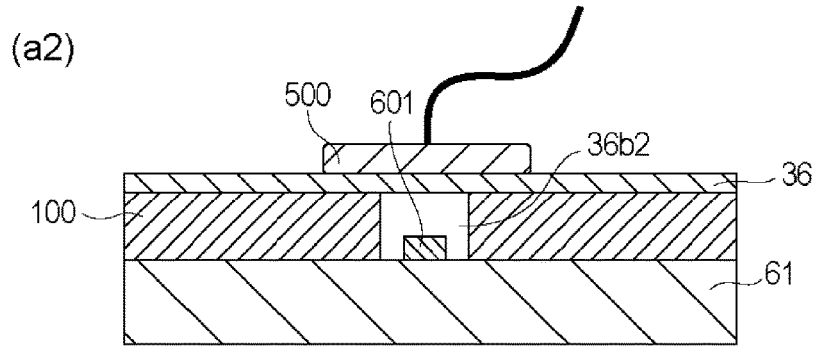
Figure 13:
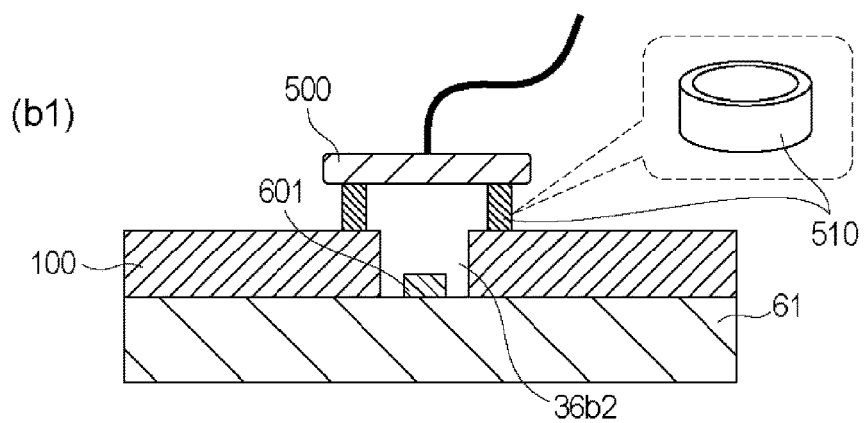
Figure 13:
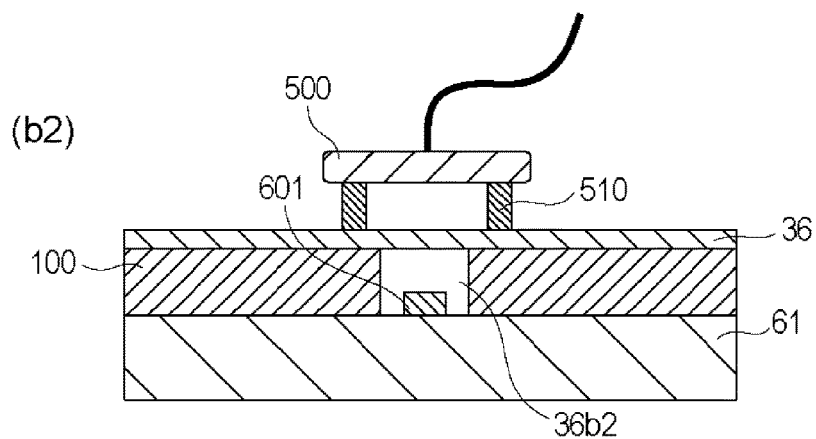

Parts (a1), (a2), (b1) and (b2) of FIG. 13 are schematic views each for illustrating an example of a measuring method of a light transmittance of the sheet material.

Figure 14:
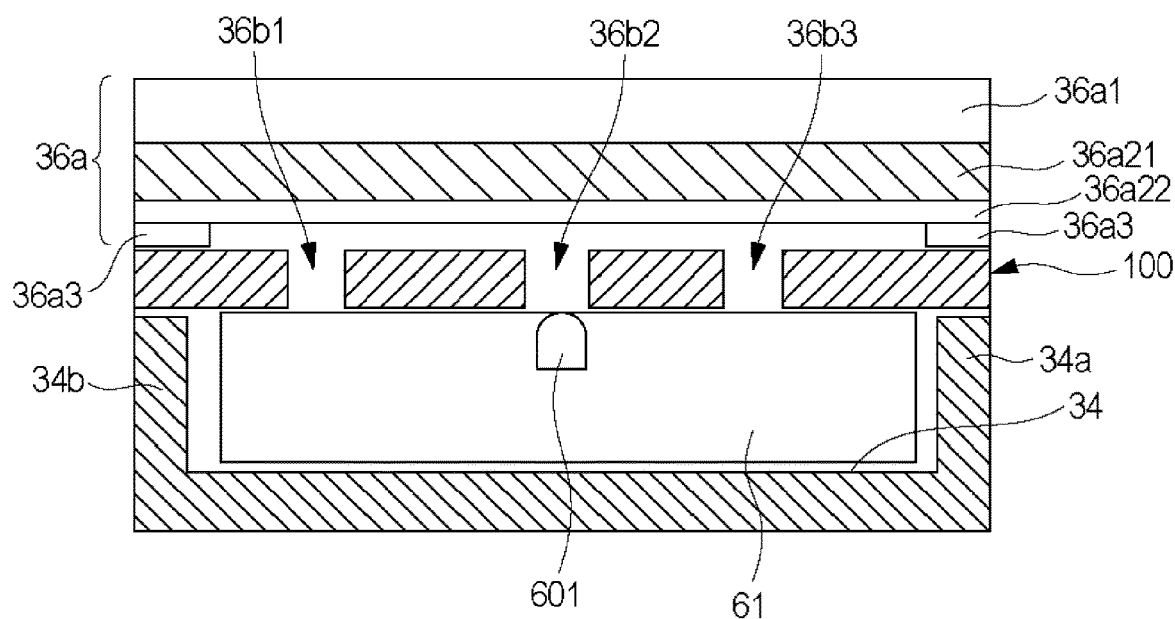

FIG. 14 is a schematic view for illustrating a sheet material according to a modified embodiment.

Figure 15:
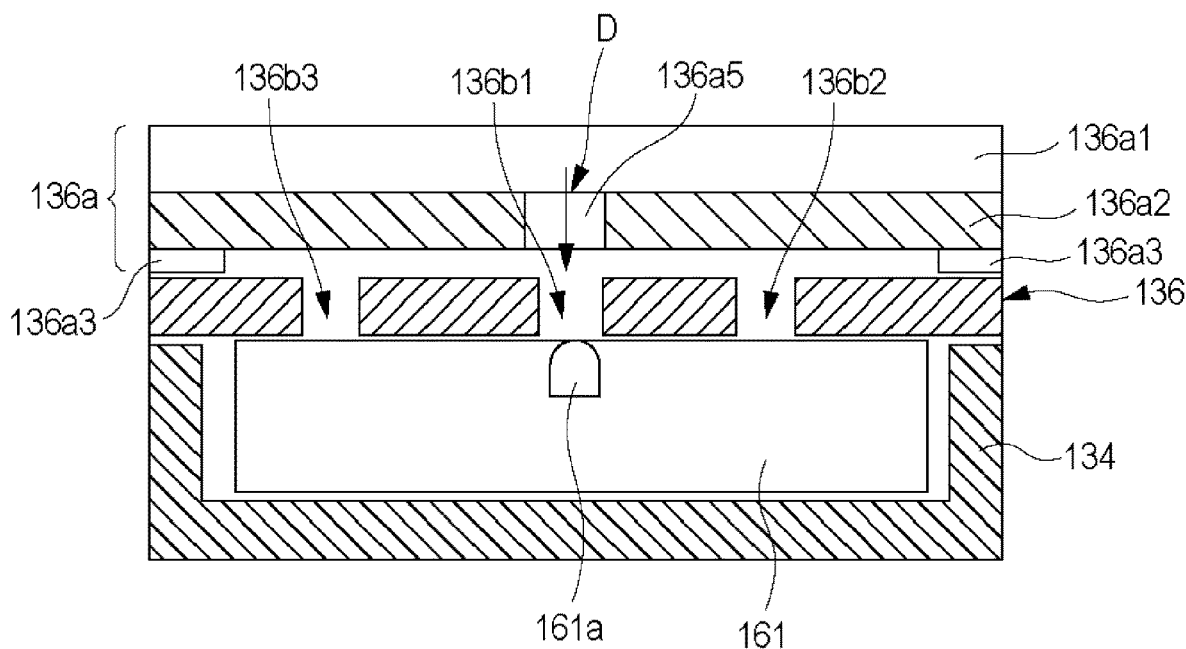

FIG. 15 is a schematic view for illustrating a sheet material in a comparison example.

DESCRIPTION OF THE EMBODIMENTS

In the following, embodiments for carrying out the present invention will be described with reference to the drawings. In the following description, as regards dimensions, materials, shapes and relative arrangement of constituent elements, the scope of the present invention is not intended to be limited to those described below unless otherwise specified.

(Image Forming Apparatus)

Figure 1:
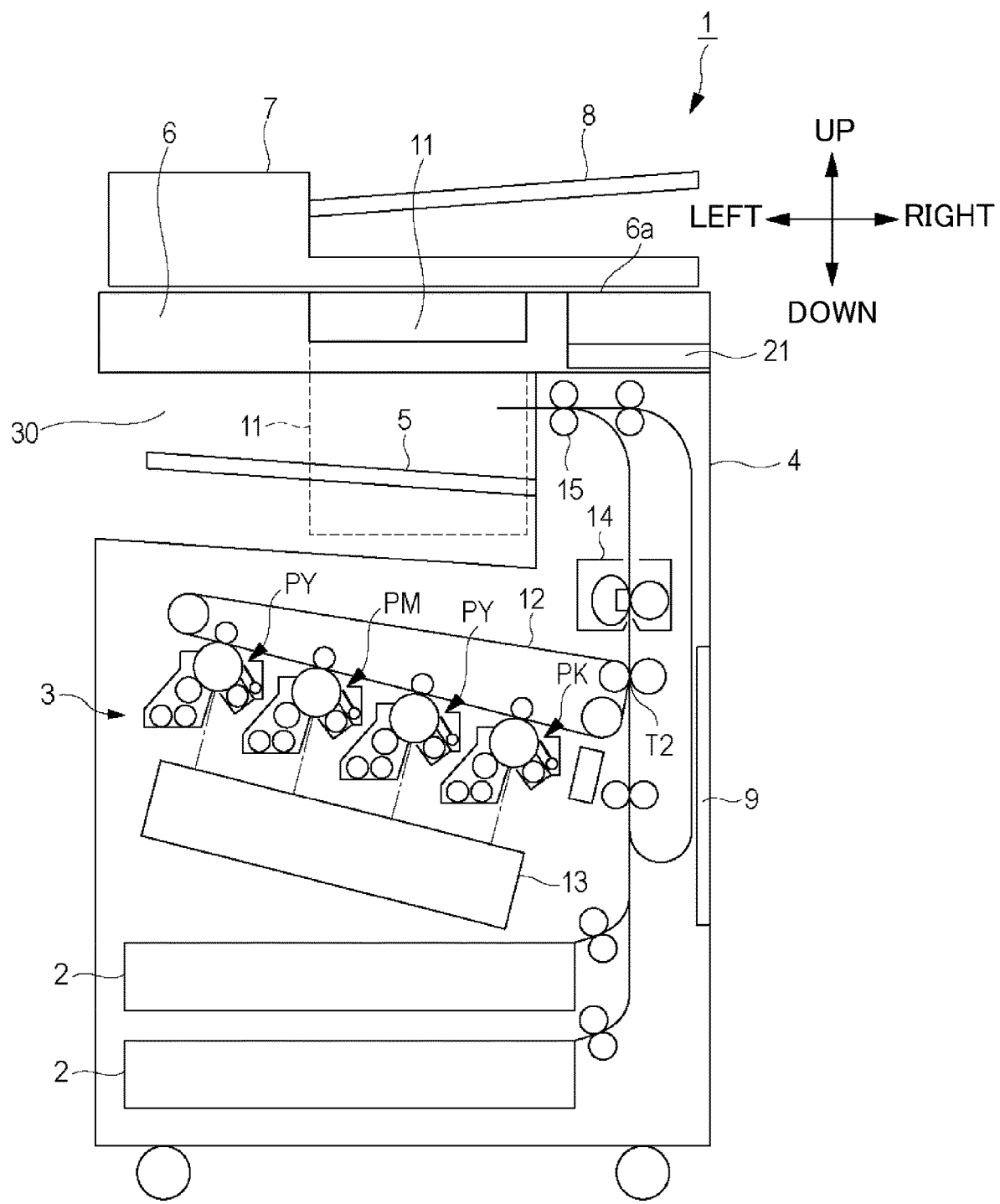
FIG. 1 is a schematic sectional view of an image forming apparatus.

FIG. 1 is a schematic sectional view of an image forming apparatus 1 in an embodiment. The image forming apparatus 1 is, for example, a multi-function machine having various functions such as a copying function, a reading function and a printing function. However, the image forming apparatus for carrying out the present invention is not limited to the copying machine, but for example, the image forming apparatus may also be a printer including no image reading apparatus 6.

An upward direction, a downward direction, a rightward direction, a leftward direction, a rearward direction and a frontward direction which are used in the following description will be defined as shown in FIG. 1. In FIG. 1, a direction from a front surface toward a back surface of the drawing sheet is defined as the rearward direction, and a direction from the back surface toward the front surface of the drawing sheet is defined as the frontward direction.

In FIG. 1, the image forming apparatus 1 includes an image forming portion for forming an image on a recording sheet or the like as an object to be recorded and includes an image reading apparatus 6, provided above the image forming portion with respect to a vertical direction, for reading the image on the sheet such as an original as an object to be read. Further, the image forming apparatus 1 includes an operating portion 11 for receiving an operation by an operator such as a user or a service person. The operating portion 11 is disposed so that an operating surface faces upward in a height position of the image reading apparatus 6. Further, the operating portion 11 is mounted so as to be rotatable relative to the image forming apparatus 1. Specifically, the operating portion 11 is rotatable about a shaft, as a rotation shaft, parallel to a left-right direction in FIG. 1. An axial direction of this rotation is parallel to a widthwise direction of the image forming apparatus 1 which is the left-right direction in FIG. 1. A broken line portion represents a contour of the operating portion when the operating surface of the operating portion 11 is oriented toward a front side of the image forming apparatus 1.

With respect to the widthwise direction (left-right direction) of the image forming apparatus 1, an authentication terminal accommodating portion 21 is provided so as to be adjacent to the operating portion. Here, the widthwise direction is a direction perpendicular to both a vertical direction and a front-rear direction of the image forming apparatus 1. Although described later specifically, in the authentication terminal accommodating portion 21, an IC card reader 61 for reading a non-contact IC card is accommodated.

Figure 2:
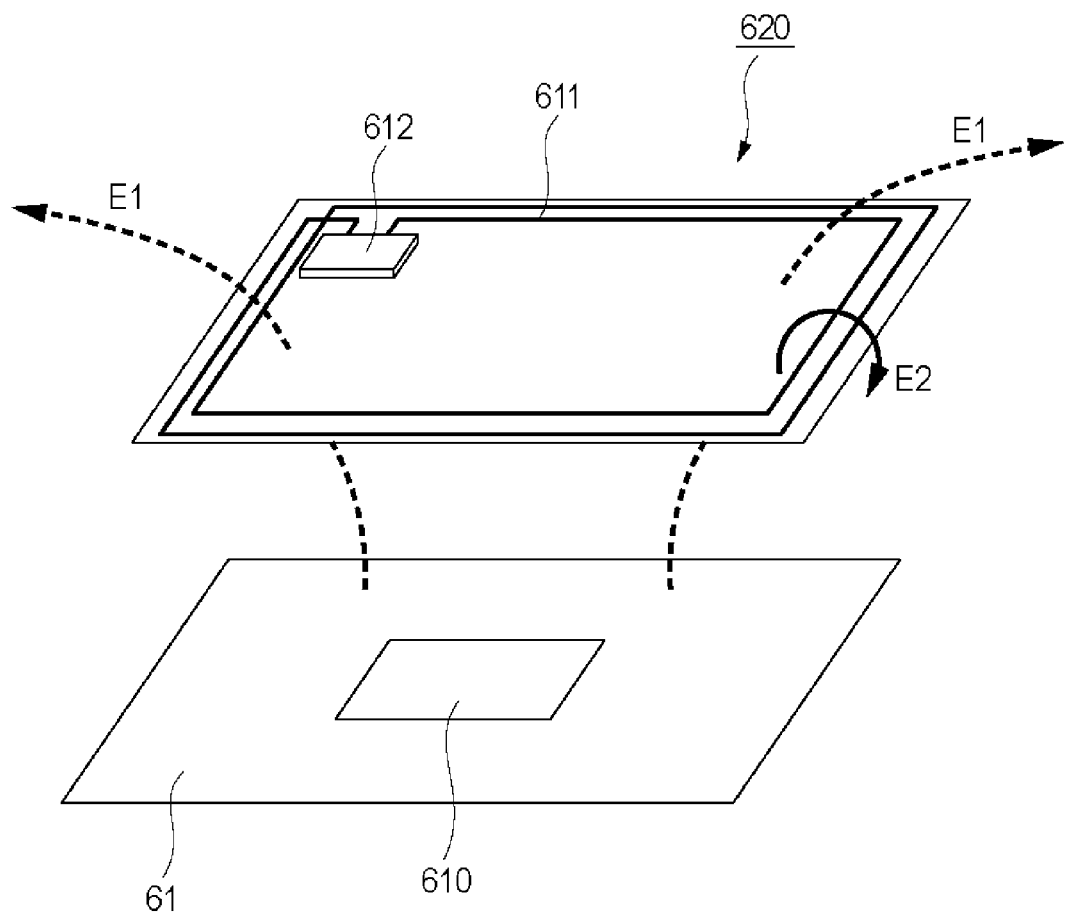
FIG. 2 is a schematic view for illustrating a communication method between an IC card and an IC card reader.

FIG. 2 is a schematic view for illustrating a mechanism for establishing mutual communication between the IC card reader 61 and an IC card 620. FIG. 2 shows a state in which the IC card 620 is held over the IC card reader 61. As shown in FIG. 2, the IC card reader 61 includes an antenna portion 610. In this embodiment, in response to turning-on of a main switch (voltage source) of the image forming apparatus 1, electric power is supplied to the IC card reader 61, so that the antenna portion 610 generates a magnetic field E1.

On the other hand, the IC card 620 is provided with an IC chip 612 and a coil 611. When the IC card 620 is held over the IC card reader 61, a magnetic field E2 is formed around the coil 611 by the magnetic field E1, so that induced current generates in the coil 611. By the induced current flowing through the coil 611, the IC chip 612 is driven, so that the mutual communication is established between the IC card 620 and the IC card reader 61. In the above-described manner, the mutual communication between the IC card 620 and the IC card reader 61 is carried out. This communication is executed when a distance between the IC card 620 and the IC card reader 61 becomes a predetermined distance or less, and therefore is called near field wireless communication.

In this embodiment, the authentication terminal accommodating portion 21 is provided on an end portion side (right-hand side end portion) of the image forming apparatus 1 with respect to the widthwise direction of the image forming apparatus 1. Although described specifically later, the operator logs in to the image forming apparatus 1 by holding his (her) IC card over the authentication terminal accommodating portion 21. The authentication terminal accommodating portion 21 is positioned at the same level as the operating portion 11, and therefore, the operator is capable of easily holding his (her) IC card over the authentication terminal accommodating portion 21. Incidentally, in this embodiment, the authentication terminal accommodating portion 21 is provided at the right-hand side end portion of the image forming apparatus 1 on the front side of the image forming apparatus 1, but may also be provided so as to project further rightward from the right-hand side end portion of the image forming apparatus 1. Further, the authentication terminal accommodating portion 21 is not required to be provided on the front side of the image forming apparatus, but for example, may also be provided on a right-hand side surface or a left-hand side surface of the image forming apparatus 1, for example. In this embodiment, when the user positioned opposed to the display portion 55 and operating the display portion 55 sees the image forming apparatus 1, the authentication terminal accommodating portion 21 is disposed on the right-hand side of the image forming apparatus 1.

As shown in FIG. 1, the image forming apparatus 1 in this embodiment is a full-color multi-function machine of a tandem type in which image forming portions PY, PM, PC and PK corresponding to yellow, magenta, cyan and black, respectively are provided along an intermediary transfer belt 12. In the image forming portion PY included in a main assembly portion 3, a yellow toner image is formed and primary-transferred onto the intermediary transfer belt 12. In the image forming portion PM, a magenta toner image is formed and primary-transferred superposedly onto the yellow toner image on the intermediary transfer belt 12. In the image forming portions PC and PK, a cyan toner image and a black toner image are formed, respectively, and are successively primary-transferred superposedly onto the toner images on the intermediary transfer belt 12 in a similar manner.

The four color toner images carried on the intermediary transfer belt 12 are fed to a secondary transfer portion T2 and are collectively secondary-transferred onto a recording material (sheet) P nipped and fed superposedly on the intermediary transfer belt 12 through the secondary transfer portion T2. The recording sheet P on which the toner images are secondary-transferred at the secondary transfer portion T2 is heated and pressed by a fixing device 14 accommodated in a vertical path portion 4, so that the toner images are fixed on a surface of the recording sheet P, and thereafter the recording sheet P is discharged onto a sheet discharge tray 5 by a discharging read pair 15.

At a lower portion of the main assembly 3, a sheet feeding cassette 2 (example of a sheet accommodating portion) is provided. The sheet feeding cassette 2 is provided so as to be capable of being pulled out of the image forming apparatus 1 and can be pulled out of the image forming apparatus 1 toward the front side of the image forming apparatus 1. The recording sheets P are picked up one by one from the sheet feeding cassette 2, and the picked-up recording sheet P is fed to the vertical path portion 4. The recording sheet P awaits in front of the secondary transfer portion T2 and then is sent to the secondary transfer portion T2 by being timed to the toner images on the intermediary transfer belt 12. In the vertical path portion 4 positioned below the operating portion 11, a feeding mechanism, for the recording sheet P, including the sheet feeding read pair 15, and various sensors, a blowing fan and the like are accommodated. The recording sheet P passed through the vertical path portion 4 is discharged to an in-body sheet discharge space 30 provided between the image reading apparatus 6 and the main assembly portion 3.

In the in-body sheet discharge space 30, the sheet discharge tray 5 is provided. The discharged recording sheets P are stacked on the sheet discharge tray 5. By this, the operator is capable of taking out the recording sheets P on which the images are formed in the main assembly portion 3, of the image forming apparatus 1 from the front (surface) side of the image forming apparatus 1.

Above the in-body sheet discharge space 30, the image reading apparatus 6 is disposed. The image reading apparatus 6 optically reads an image on a lower surface of an original placed on a reading surface 6a thereof and then converts the image to image data, and in a state in which an automatic original feeding device 7 is raised, the original is placed on the reading surface 6a. The automatic original feeding device 7 separates the sheets one by one from an original bundle stacked on an original tray 8 and causes the separated original (sheet) to pass through the reading surface 6a, and thus causes the image reading apparatus 6 to skim the original.

In an automatic reading mode, the original is set on the original tray 8. In a manual reading mode, the automatic original feeding device 7 is rotated rearward and opened upward, so that the operator has access to the reading surface 6a of the image reading portion 6. In this embodiment, the operating portion 11 is provided at a position lower than the reading surface 6a so as not to hinder accessibility of an operation of setting the original on the reading surface 6a. After the operator sets the original on the original tray 8 (or the reading surface 6a of the image reading portion 6) of the automatic original feeding device 7, the operator inputs pieces of information such as a monochromatic or color image reading mode, a copy output size, a kind of the recording material (sheet), the number of copies and the like, through the operating portion 11.

Figure 3:
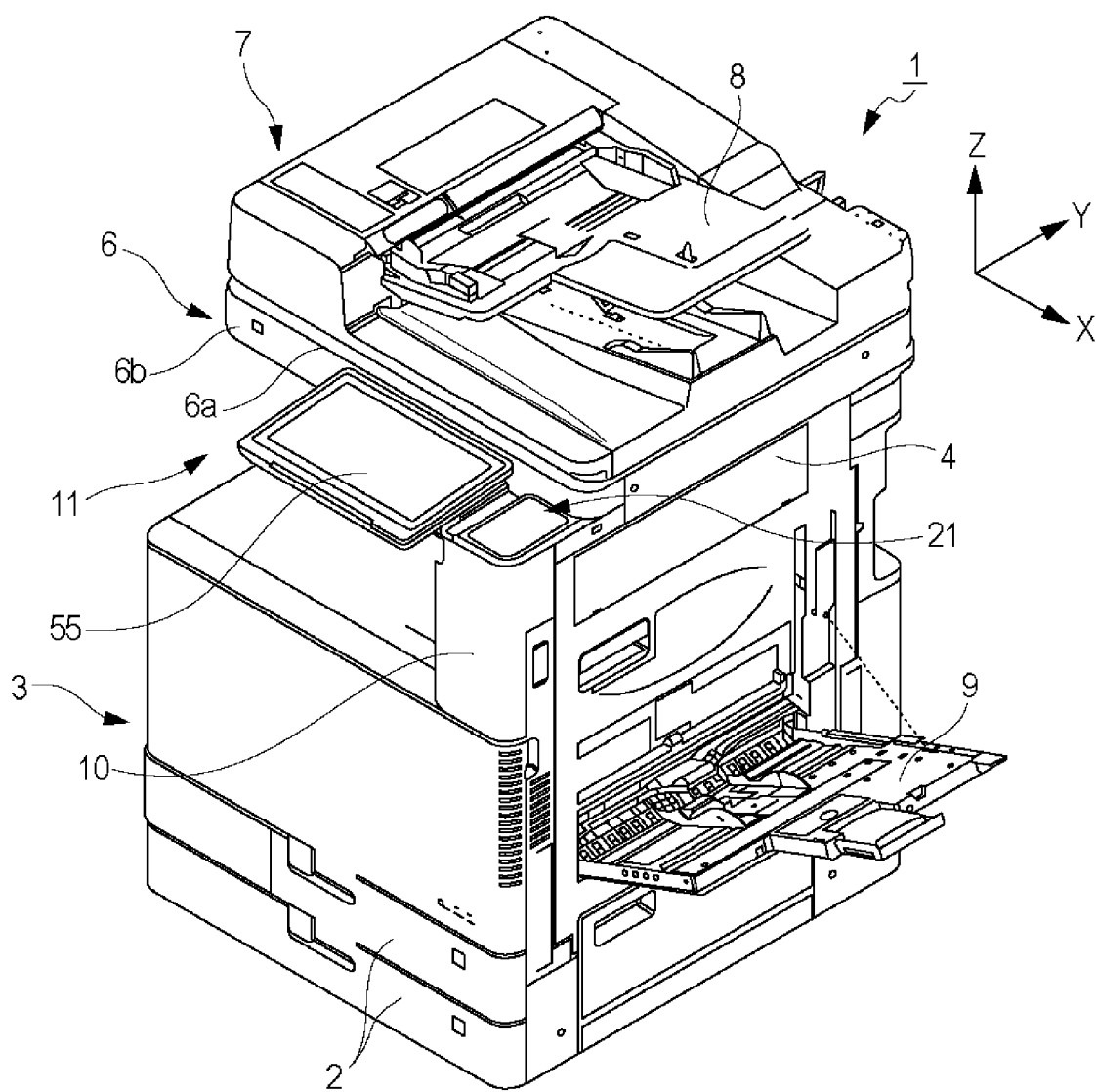
FIG. 3 is a schematic perspective view of the image forming apparatus.

FIG. 3 is a perspective view of the image forming apparatus 1. as shown in FIG. 3, the operating portion 11 includes the display portion 55. On the display portion 55, the pieces of information such as the monochromatic or color image reading mode, the copy output size, the kind of the recording material, the number of copies and the like are displayed. The display portion 55 in this embodiment is a liquid crystal screen of a touch panel type. Ten keys for inputting the number of copies and a destination telephone number of facsimile transmission are displayed as software keys in a predetermined area of the display portion 55. For that reason, the operating portion 11 is not provided with hardware keys or the like. The display portion 55 is the touch panel and receives input of the information by a touch operation, such as a flick, a swipe or a scroll, by the operator. Further, the display portion 55 is capable of displaying information on a printing condition to the operator. For example, when the operator prints the image on the sheet, pieces of information such as a sheet size and the number of sheets are displayed on the display portion 55. These conditions settable by the user at the time of printing are collectively referred to as a "printing condition (also referred to as an image forming condition)". Each of users is capable of registering his (her) own intrinsic printing condition in the image forming apparatus. For example, as regards the user when most of condition in the case of printing is an A4 monochromatic printing, it is desirable that "A4 monochromatic" printing condition is set at the time when the user logs in the image forming apparatus 1. A memory of the image forming apparatus 1 is capable of storing the printing condition every user. Accordingly, a constitution in which at the time when the log-in of the user to the image forming apparatus 1 is completed, the "printing condition" of the user is automatically set can also be employed.

Here, "log-in" refers to action for permitting the user to receive authentication of the image forming apparatus 1, and for example, action such that the user inputs a "user ID" and a "password" to the image forming apparatus 1. A "state in which the log-in is completed" refers to a state in which the user is identified by the image forming apparatus 1. For example, in the case where the "printing condition" is set in the image forming apparatus 1 by the user, in response to user identification by a CPU, the "printing condition" of the identified user is retrieved from the memory and is automatically set. Further, when the user is in the log-in state, the display portion 55 may also display the user ID of the user who logs in to the image forming apparatus 1. In a constitution capable of such display, depending on whether or not the user ID is displayed, whether or not the user currently logs in to the image forming apparatus 1 can be discriminated.

In order to permit the user to receive the authentication of the image forming apparatus 1, information on the user is stored in advance in the memory of the image forming apparatus 1. As the information on the user, not only the "user 2D" and the "password" of the associated user, but also the above-described "printing information" intrinsic to the user are used. The user performs a log-in operation, i.e., inputs the "user ID" and the "password", and then the inputted data are checked against the user information stored in advance in the memory of the image forming apparatus 1, and when the inputted data coincide with the user information, "authentication" is completed. Naturally, information on the user is not required to be stored in a physical memory of the image forming apparatus 1, but a method of retrieving the information through a server may also be employed.

(Authentication Device (Terminal) Accommodating Portion)

Figure 4:
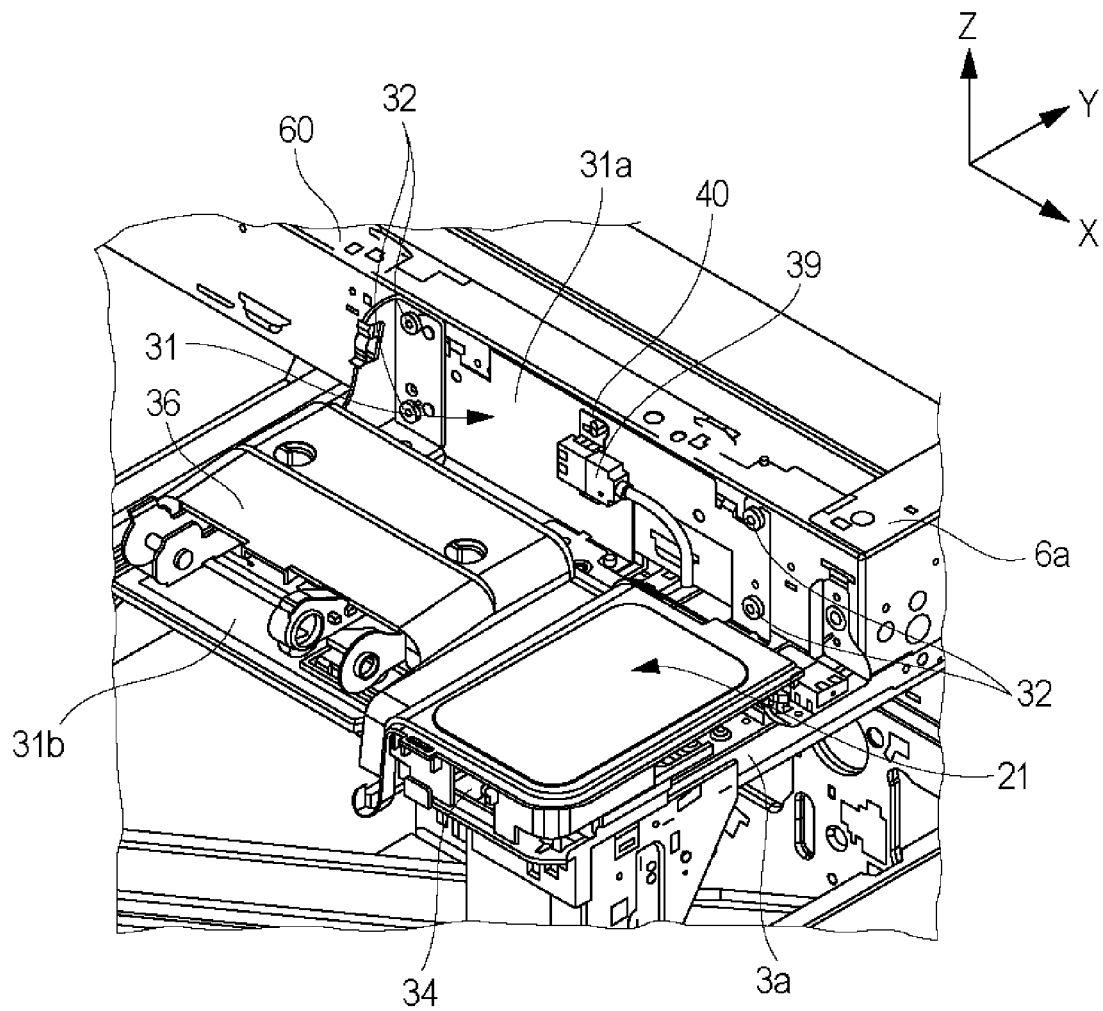
FIG. 4 is a schematic view for illustrating a cover portion covering the IC card reader and a periphery thereof.
Figure 5:
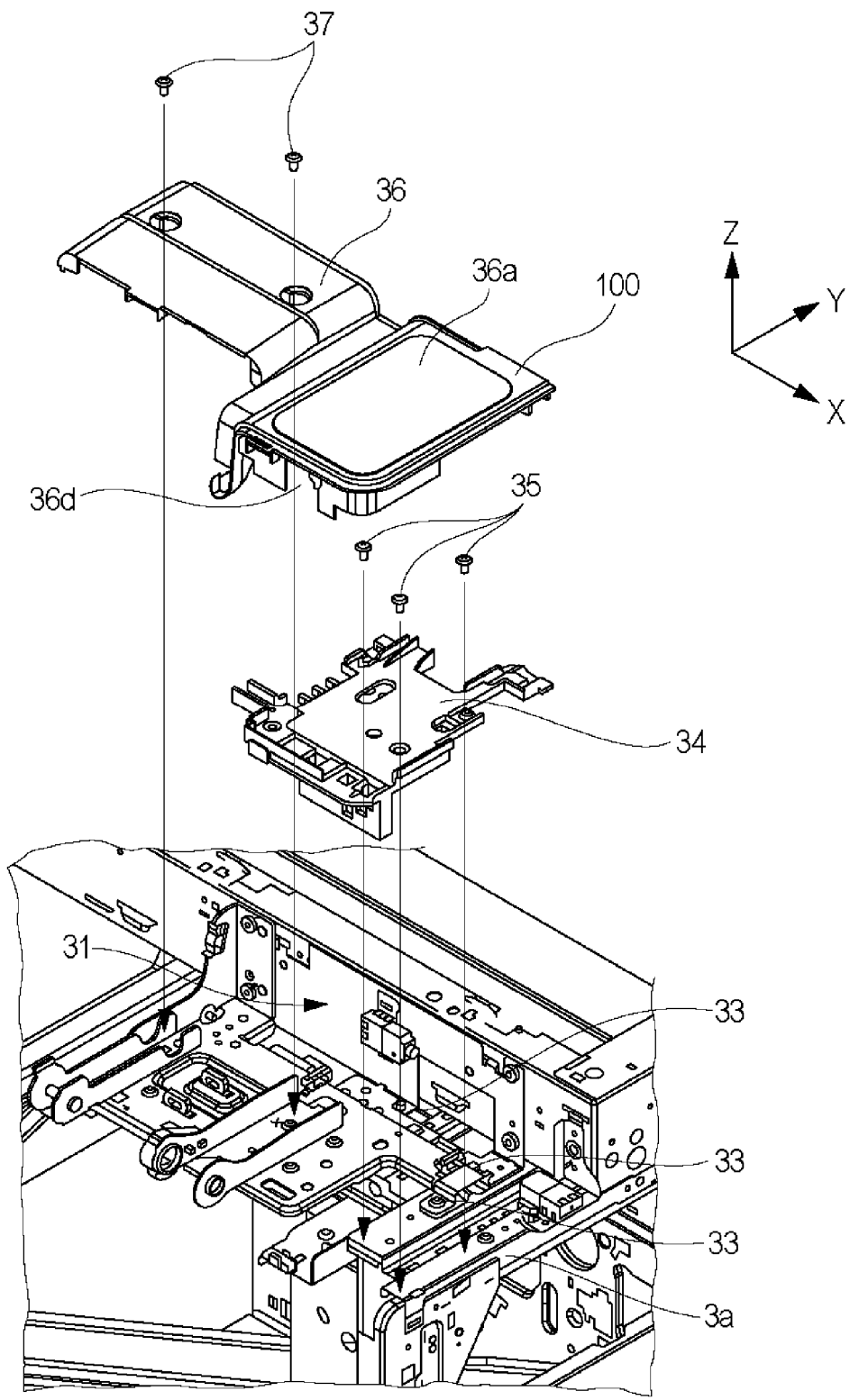
FIG. 5 is an exploded perspective view of the cover portion and the periphery thereof.
Figure 6:
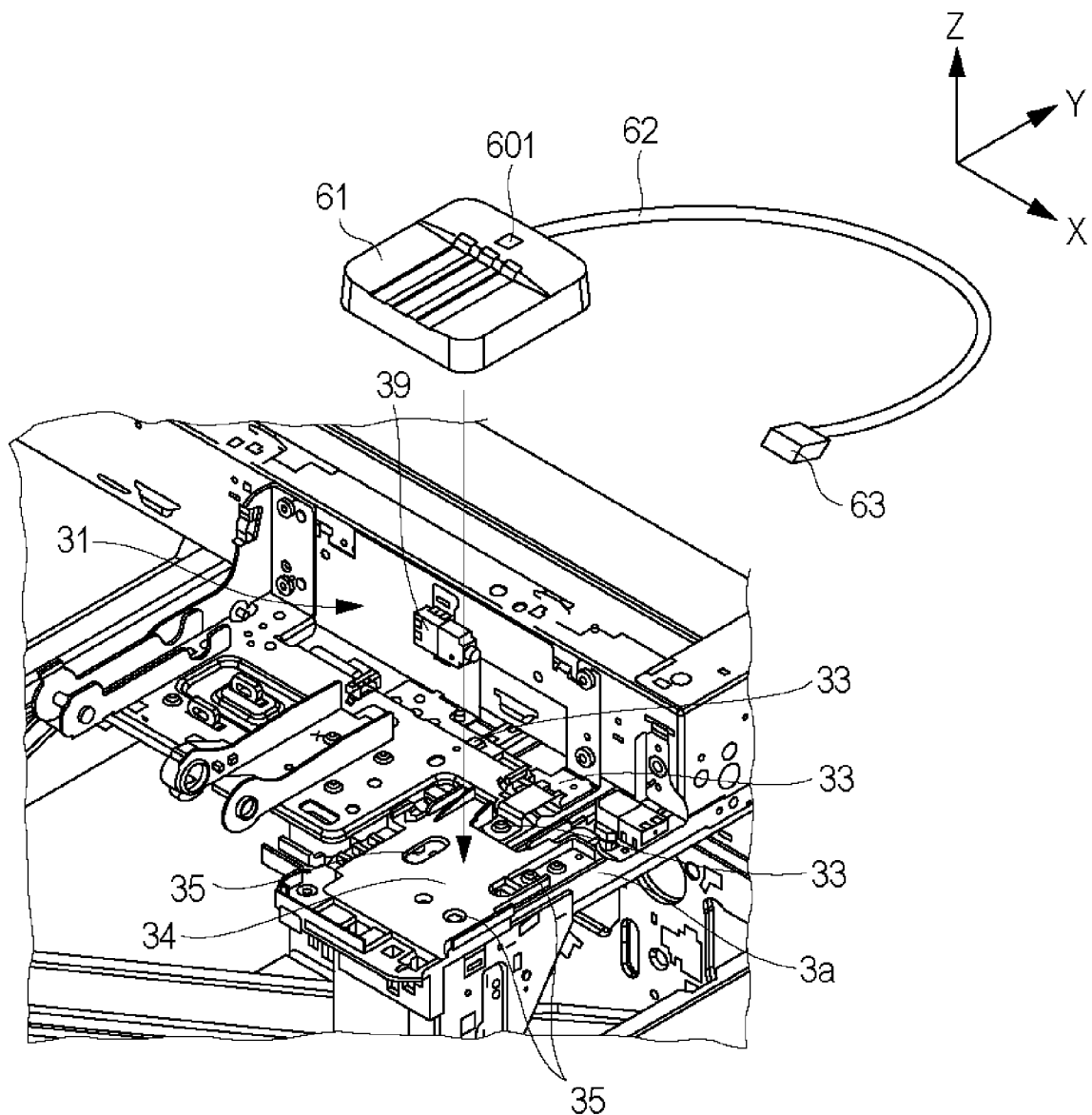
FIG. 6 is a schematic view for illustrating a mounting portion where the IC card reader is to be mounted.

The authentication device (terminal) accommodating portion 21 will be described using FIGS. 4 to 6. FIG. 4 is an enlarged view of the authentication device accommodating portion 21 and the neighborhood thereof when the operating portion 11 is not shown, FIG. 5 is an exploded perspective view of the authentication device accommodating portion 21, and FIG. 6 is a perspective view for illustrating mounting of the IC card reader 61 onto the authentication device accommodating portion 21.

As shown in FIG. 4, an L-(shaped) metal plate 31 on which an operation portion table 31 for fixing the operating portion 11 is fixed is secured, with a plurality of screws 32, to a front frame 60 constituting a front-side frame of the image forming apparatus 1. On the front-side surface of the front frame 60, a plurality of unshown pieces of burring for screws are formed. The L-metal plate 31 is fixed to the front frame 60 with the screws 32 from the front surface side corresponding to the unshown pieces of burring. The L-metal plate 31 is a metal plate material having a substantially L-shape with respect to YZ cross-section. The L-metal plate 31 includes a first surface 31a and a second surface 31b. The first surface 31a is fixed to the front frame 60 with the screws 32. The front frame 60 is a part of a frame, of the frame of the image forming apparatus 1, positioned on the front side.

Further, as one of frames provided for ensuring strength and rigidity of the image forming apparatus 1, an upper right stay 3a is used. On a top surface of the upper right stay 3a, a plurality of unshown pieces of burring for screws are formed. The second surface 31b of the L-metal plate 31 is fixed to the upper right stay 3a with the screws from an upper surface side correspondingly to the pieces of burring of the upper right stay 3a. Thus, as regards the L-metal plate 31, the first surface 31a is fixed to the front frame 60 and the second surface 31b is fixed to the upper right stay 3a.

Although not illustrated in the figures, on a back surface side of the image forming apparatus 1, a control substrate is provided. A USB cable 38 extends from the control substrate to the front side of the image forming apparatus 1 through the upper right stay 3a. The USB cable 38 is provided with a connector 39 at a free end thereof, and this connector 39 is fixed to the front frame 60 with a screw 40. The connector 39 has a function of a USB port in which a connector 63 provided at a free end of a cable 62 of the IC card reader 61 described later is inserted. The connector 63 is a USB connector and is supplied with electric power from the connector 39 as the USB port.

Further, as shown in FIG. 5, on the top surface of the upper right stay 3a, a plurality of unshown pieces of burring are formed on the right-hand side of the L-metal plate 31 are at a position where the pieces of burring do not overlap with the L-metal plate 31 as seen from above. Then, a mounting portion 34 is fixed to the upper right stay 3a with a plurality of screws 35 correspondingly to the unshown pieces of burring of the upper right stay 3a. On this mounting portion 34, the IC card reader 61 is mounted. The mounting portion 34 is positioned on a side downstream of the image reading apparatus 6 with respect to a pulling-out direction of the sheet feeding cassette 2, i.e., in front of the image reading apparatus 6. A part of the mounting portion 34 is positioned on the front side of the image reading apparatus 6, so that the IC card reader 61 is also disposed in front of the image reading apparatus 6. For that reason, a cover portion 100 (example of the reader cover) covering the IC card reader 61 is also positioned in front of the image reading apparatus 6.

Further, the mounting portion 34 and the cover portion 100 are provided at the substantially same level (height) as the display portion 55. By this, the user can easily hold his (her) IC card over the authentication terminal such as the IC card reader 61. Further, the mounting portion 34 and the cover portion 100 are provided adjacent to the display portion 55 with respect to the widthwise direction of the image forming apparatus 1, whereby usability is improved.

On the second surface 31b of the L-metal plate 31, the unshown pieces of burning are formed. The operating portion table 36 is fixed with a plurality of screws 37 correspondingly to a plurality of pieces of buffing of the L-metal plate 31. The operating portion 11 is mounted on the operating portion table 36. Although specifically described later, the operating portion table 36 also has a function of covering the mounting portion 34.

As shown in FIG. 6, the IC card reader 61 is provided with the cable 62 and at the free end of the cable 62, the connector 63 which is the USB connector is provided. To the IC card reader 61, electric power is supplied through the connector 63 and the cable 62. The connector 63 is connected to the connector 39 fixed to the first surface 31a of the L-metal plate 31 with the screw 40 (FIG. 4). On the other hand, the IC card reader 61 is mounted on the mounting portion 34. In the case where the cable 62 has an excessive length, an excessive length process is performed in front of the first surface 31a of the L-metal plate 31. Thereafter, the card operating portion table 36 is fixed to the second surface 31b of the L-metal plate 31 with the screws 37.

A fixing method of the IC card reader 61 to the mounting portion 34 is different depending on the IC card reader 61 mounted in the image forming apparatus 1. A size and a shape of the IC card reader 61 are different every manufacturer. For that reason, although specifically described later, depending on the size and the shape of the IC card reader 61, there is a need to change the fixing method of the IC card reader 61 to the mounting portion 34.

Further, as shown in FIG. 6, the IC card reader 61 includes the lighting portion 601 where light comes on. In this embodiment, the lighting portion 601 is an LED (Light Emitting Diode), for example, and is incorporated in the IC card reader 61. The lighting portion 601 indicates an operation state by emitting light. In the case of this embodiment, when the IC card reader 61 can normally read information of the IC card, the lighting portion 601 is turned on in green, and when the IC card reader 61 cannot normally read the information of the IC card, the lighting portion 601 is turned on in red.

Incidentally, the lighting portion 601 is not necessarily only a single lighting portion, but a constitution including a plurality of lighting portions may also be employed. For example, two lighting portions are formed and juxtaposed, and in the case where the IC card information is normally read, one lighting portion is turned on in green, and in the case where the IC card information is not normally read, the other lighting portion is turned on in red. Further, the operation state of the IC card reader 61 may also be indicated by not only lighting but also blinking.

Here, depending on a kind of the IC card reader 61, the lighting portion 601 is provided at a different position on the IC card reader 61 in some cases. Part (a) of FIG. 7 is schematic view of the IC card reader 61 used in description of this embodiment, and part (b) of FIG. 7 is a schematic view of an IC card reader 71 different from the IC card reader 61.

As shown in part (a) of FIG. 7, the IC card reader 61 includes the lighting portion 601 on an upper side, on the drawing sheet, which is a side where the cable 62 is provided. On the other hand, as shown in part (b) of FIG. 7, the IC card reader 71 includes a lighting portion 701 on a lower side, on the drawing sheet, which is a side opposite from a side where a cable 72 is provided. Thus, the IC card readers are not standardized in terms of a place where the lighting portion is provided, so that there is a possibility that the position of the lighting portion is different depending on products. For that reason, for example, in the case where an IC card reader is mounted later in the image forming apparatus or in the like case, it is not known that what IC card reader is mounted in some instances. Accordingly, for example, even in the case where the IC card reader 61 is mounted in the image forming apparatus 1 and in the case where the IC card reader 71 is mounted, there is a need to constitute the cover portion 100 (example of a terminal cover) so that the lighting portion 601 (701) can be visually recognized.

Here, an example of the IC card reader used in the image forming apparatus 1 is shown in FIG. 8. Further, in FIG. 8, a top surface shape, a mounting method and a place of the lighting portion of IC card readers No. 1 to No. 5 are shown in combination. In a lowermost row of a table of FIG. 8, views for illustrating a hole, of holes formed in the cover portion 100, opposed to the lighting portion 601 are shown. As described above, the size and the shape of the IC card reader mounted in the image forming apparatus 1 are different depending on the kind of the IC card reader, and therefore, there is a need to change the mounting method of the IC card reader onto the mounting portion 34 correspondingly thereto.

Parts (a) and (b) of FIG. 9 are schematic views each for illustrating a state in which the IC card reader mounted on the mounting portion 34 is covered with the cover portion 100. Each of parts (a) and (b) of FIG. 9 is a sectional view, as seen from a right-hand side of the image forming apparatus 1, when the operating portion 11 is cut away along the front-rear direction of the image forming apparatus 1. Part (a) of FIG. 9 is the schematic view for illustrating the case where the IC card reader No. 1 is mounted in the image forming apparatus 1, and part (b) of FIG. 9 is the schematic view for illustrating the case where the IC card reader No. 4 is mounted in the image forming apparatus 1.

As shown in part (a) of FIG. 9, the IC card reader No. 1 is mounted on the mounting portion 34 through a sponge 630, and the IC card reader and the cover portion 100 are bonded to each other with a double-side tape. The IC card reader is in a suspended state from the cover portion 100 by the double-side tape, but a bottom of the IC card reader is supported by the sponge, so that the IC card reader is prevented from being detached from the cover portion 100. IC card readers No. 2 and No. 3 are also sandwiched between the sponge provided on the mounting portion 34 and the cover portion 100 and are bonded to the cover portion 100 with the double-side tape as in the case of the IC card reader No. 1. When the cover portion 100 is mounted on the IC card reader, by adjusting the cover portion 100 so that the lighting portion of the IC card reader is positioned opposed to either one of a plurality of openings formed in the cover portion 100, so that the lighting portion is prevented from being hidden by the cover portion 100.

On the other hand, as shown in part (b) of FIG. 9, the IC card reader No. 4 is not flat in top surface shape thereof, and therefore, it is difficult to fix the IC card reader and the cover portion 100 with the double-side tape. For that reason, a relative position between the IC card reader and the cover portion 100 is determined by pressing the IC card reader toward the cover portion 100 through a sponge placed on the mounting portion 34. The IC card reader is sandwiched between the sponge and the cover portion 100, and therefore, the IC card reader does not move relative to the mounting portion 34 and the cover portion 100. The IC card reader No. 5 is also not flat in top surface shape thereof similarly as in the case of the IC card reader No. 4, and therefore, is urged toward the cover portion 100 by the sponge placed on the mounting portion 34, so that a position of the IC card reader No. 5 relative to the cover portion is fixed. The IC card reader is mounted on the sponge placed on the mounting portion 34 so that the lighting portion and either one of the openings formed in the cover portion 100 are opposed to each other when the IC card reader is covered with the cover portion 100. By doing so, the lighting portion is prevented from being hidden by the cover portion 100.

Further, as shown in FIG. 8, the place of the lighting portion provided in the IC card reader is different depending on the kind of the IC card readers. In the row of "place of lighting portion" shown in FIG. 8, the place indicated by a solid rectangular portion is the place of the lighting portion. For example, in the case of the IC card reader manufactured by company A, the lighting portion is provided on the upper side of the IC card reader on the drawing sheet. On the other hand, in the case of the IC card reader manufactured by company B, the lighting portion is provided on the lower side of the IC card reader on the drawing sheet. Thus, depending on the kind of the IC card reader, the place where the lighting portion is provided is different, and therefore, the cover portion 100 is provided with the plurality of openings so that the lighting portion is not hidden by the cover portion 100 even in the case where either IC card reader is mounted.

As shown in the lowermost row of the table in FIG. 8, in this embodiment, the cover portion 100 is provided with eight openings in total. In each cover portion 100 shown in FIG. 8, eight rectangular portions indicated by a solid (bold) line and broken lines represent the openings. Either opening is used for causing the user to visually recognize the light of the lighting portion provided in the IC card reader. Further, in FIG. 8, the opening opposed to the lighting portion of the IC card reader is indicated by the solid (bold) line. When the IC card reader is covered with the cover portion 100. The lighting portion is opposed to the opening indicated by the solid line, and therefore, the user is capable of visually recognize the lighting portion through the opening. Through other openings indicated by the broken lines, the user can visually recognize the IC card reader. Depending on the kind of the IC card reader, a plurality of lighting portions are provided in some instances, and therefore, the lighting portions can be visually recognized through associated openings formed in the cover portion 100 in some cases.

Here, to the IC card readers No. 1 to No. 3, the cover portions 100 are bonded with the double-side tape. For that reason, when the cover portion 100 is bonded to the IC card reader, it is noticed that either one of the openings formed in the cover portion 100 is positioned opposed to the lighting portion of the IC card reader.

The example of the IC card readers shown in FIG. 8 is one example, but it is understood that the sizes thereof are different from each other. It is not known that which IC card reader is mounted on the mounting portion 34. For that reason, in this embodiment, there is a need that as regards at least the example of the IC card readers shown in FIG. 8, all the IC card readers are mountable on the mounting portion 34. Therefore, in this embodiment, on the basis of a lateral width of the IC card reader No. 5 (lateral width: 77 mm) which is broadest in lateral width and a vertical width (length) of the IC card reader No. 2 (vertical width: 98 mm), the authentication terminal accommodating portion 21 which is an accommodating space of lateral width: 80 mm×vertical width: 100 mm was provided. By this, at least irrespective of the IC card readers shown in FIG. 8, when the IC card reader with a size capable of being accommodated in this accommodating space is used, the IC card reader can be accommodated in the authentication terminal accommodating portion 21. Thus, the authentication terminal accommodating portion 21 is constituted in advance in consideration of the size of the IC card reader which is possibly used, and the double-side tape and the sponge are used for each purpose, so that a change in relative position between the IC card reader and the cover portion 100 is prevented.

(Cover Portion and Transparent Member)

Next, using FIG. 10, the cover portion 100 and a transparent member 36a will be described. FIG. 10 shows a state in which the IC card reader 61 mounted on the mounting portion 34 is covered with the cover portion 100. As shown in FIG. 10, the cover portion 100 is a part of the operating portion table 36 in this embodiment. However, although this embodiment is an embodiment in which the cover portion 100 constitutes the part of the operating portion table 36, an embodiment in which the cover portion 100 in provided as an independent single member may also be employed. That is, an embodiment in which the card operating portion table 36 on which the operating portion is mounted and the cover portion 100 covering the IC card reader 61 are members separated from each other and only the cover portion 100 is provided alone and is capable of being mounted in and dismounted from the image forming apparatus 1 may also be employed. In that case, for example, the cover portion 100 is fastened to the mounting portion 34 with screws or the like so as to be mountable and dismountable from the mounting portion 34. Further, in this embodiment, the cover portion 100 is a 2 mm-thick blackish member formed of a resin material, and is applied onto the IC card reader 61 through the double-side tape.

As shown in FIG. 10, the cover portion 100 is provided with a plurality of holes 36b1 to 36b8 (example of openings). By forming these holes, the light emitted from the lighting portion 601 is capable of being visually recognized from an outside of the cover portion 100. In this embodiment, a diameter of each of the holes is about 5 mm.

There is a need that positions of the holes formed in the cover portion 100 can correspond to the position of the lighting portion of the IC card reader. For example, the holes are formed on the upper side and the lower side of the cover portion 100 so that both the lighting portions of the IC card reader No. 1 and the IC card reader No. 2 are visually recognizable through the cover portion 100. Specifically, with respect to a direction perpendicular to the widthwise direction perpendicular to the vertical direction and the front-rear direction of the image forming apparatus 1, when the cover portion 100 is divided into two equal regions, at least one hole is formed in each of the regions. A broken line Q shown in FIG. 10 is a line which vertically divides the cover portion 100 into the two equal regions. As is understood from this figure, in the region on the upper side (one side) of the broken line Q, the holes 36b1 to 36b3, 36b7 and 36b8 are formed. Further, in the region on the lower side (the other side) of the broken line Q, the holes 36b4 to 36b6 are formed. Thus, the cover portion 100 is divided into the two equal regions, at least one opening is formed in each of the regions on one side and the other side.

In FIG. 10, on the mounting portion 34, the IC card reader 61 is mounted. When the cover portion 100 covers the IC card reader 61 in a state in which the IC card reader 61 is mounted on the mounting portion 34, the hole 36b2 is opposed to the lighting portion 601. Accordingly, the light emitted from the lighting portion 601 passes through the hole 36b2 and travels to the outside of the cover portion 100. Incidentally, at this time, the holes 36b1 and 36b3 to 36b8 are opposed to an outer casing portion of the IC card reader 61. For that reason, the lighting portion 601 cannot be visually recognized through these holes.

On the other hand, when the cover portion 100 covers the IC card reader 71 in a state in which the IC card reader 71 is mounted on the mounting portion 34, the hole 36b6 is opposed to the lighting portion 701. Accordingly, the light emitted from the lighting portion 701 passes through the hole 36b6 and travels to the outside of the cover portion 100. Incidentally, at this time, the holes 36b1 to 36b5, 36b7 and 36b8 are opposed to an outer casing portion of the IC card reader 71. For that reason, the lighting portion 701 cannot be visually recognized through the holes 36b1 to 36b5, 36b7 and 36b8.

As described above, the cover portion 100 is provided with the hole 36b2 opposed to the lighting portion 601 of the IC card reader 61 mounted on the mounting portion 34 and the hole 36b6 opposed to the lighting portion 701 of the IC card reader 71 mounted on the mounting portion 34. By this, even in the case where the IC card reader different in place of the lighting portion is mounted, the lighting portion is not light-blocked by the cover portion 100, and therefore the same cover portion 100 can be used. There is no need to change the cover portion for the IC card reader depending on the kind (for example, the IC card reader 61 and the IC card reader 71) of the IC card reader, so that the cover portion 100 can be diverted to another IC card reader and thus an advantage in cost can be achieved.

Parts (a) to (c) of FIG. 11 are schematic views each for illustrating a positional relationship between the lighting portion 601 and the hole 36b2 formed in the cover portion 100. As described above, the cover portion 100 is disposed so that the hole 36b6 is opposed to the lighting portion 601. Although specifically described later, when the IC card reader 61 is covered with the cover portion 100, the operator fixes the cover portion 100 to the IC card reader 61 with for example, the double-side tape so that the hole 36b2 is positioned opposed to the lighting portion 601. At that time, as shown in part (a) of FIG. 11, the cover portion 100 is attached to the IC card reader 61 so that a center line C of the lighting portion 601 coincides with a center of the hole 36b2. Thus, by disposing the cover portion 100 so that the lighting portion 601 and the hole 36b2 are opposed to each other, so that a light quantity of light illuminating the inside of the hole 36b2 increases and even in the case where the sheet material 36a (example of a light transmission sheet) is used, the operator visually recognizes easily the light of the lighting portion 601.

Part (b) of FIG. 11 is an example in which the cover portion 100 is disposed so that the center line C deviates from the hole 36b2. When the cover portion 100 is attached to the IC card reader 61, depending on a mounting error thereof, the lighting portion 601 deviates from the IC card reader 61 in some cases. Particularly, this error becomes conspicuous in many cases when an operation of mounting (attaching) the cover portion 100 to the IC card reader 61 is performed by a person. In the case where the lighting portion 601 is the LED, directivity to some extent exists, and therefore, in the case where the center line C of the lighting portion 601 deviates from the center of the hole 36b2, the light quantity of the light illuminating the inside of the hole 36b2 decreases. However, when the hole 36b2 of the cover portion 100 is seen from a side where the sheet material 36a is disposed, if a part of the lighting portion 601 is visually recognizable through the hole 36b2, the light of the lighting portion 601 can be visually recognized sufficiently through the sheet material 36a. Accordingly, it is only required that the cover portion 100 is attached to the IC card reader 61 so that at least a part of the lighting portion 601 is opposed to the hole 36b2.

On the other hand, part (c) of FIG. 11 is the schematic view for illustrating the case where the lighting portion 601 is not opposed to the hole 36b2. As shown in part (c) of FIG. 11, the lighting portion 601 is covered with the cover portion 100, the operator cannot visually recognize the lighting portion 601 through the hole 36b2 formed in the cover portion 100. Thus, in the case where the lighting portion 601 and the hole 36b2 are not opposed to each other, the inside of the hole 36b2 is not sufficiently illuminated with the light emitted from the lighting portion 601. When the operator cannot visually recognize sufficiently the light of the lighting portion 601 through the sheet material 36a, the user does not readily check an operation state of the IC card reader 61. For that reason, when the cover portion 100 is attached to the IC card reader 61, as shown in part (a) of FIG. 11 and part (b) of FIG. 11, it is preferable that the cover portion 100 is mounted onto the IC card reader 61 so that the lighting portion 601 and the hole 36b2 of the cover portion 100 are opposed to each other.

As shown in parts (a) to (c) of FIG. 11, to the cover portion 100, the sheet material 36a is bonded. The sheet material 36a is a semi-transparent sheet and closes the holes 36b1 to 36b8 formed in the cover portion 100. The holes 36b1 to 36b8 of the cover portion 100 are closed, and therefore, a quality of outer appearance of the image forming apparatus 1 is improved. In this embodiment, the sheet material 36a is applied onto the cover portion 100 with the double-side tape. Naturally, the sheet material 36a may also be fixed to the cover portion 100 with an adhesive, not the double-side tape. A thickness of the sheet material 36a is set as thin as possible to as not to impair a detect performance of the IC card reader 61. In this embodiment, the thickness of the sheet material 36a is set at 1.0 mm and is thinner than a thickness of the cover portion 100.

Parts (a) and (b) of FIG. 12 are sectional view each showing the mounting portion 34, the IC card reader 61 mounted on the mounting portion 34, and the cover portion 100 when the structure shown in FIG. 10 is cut along a broken line A. Part (a) of FIG. 12 is the sectional view for illustrating light travelling from an outside of the operating portion 11 toward the cover portion 100 through the sheet material 36a. For simplification of description, the description will be made on assumption that the lighting portion 601 is not turned on.

In part (a) of FIG. 12, light beams indicated by symbols R and T are light beams travelling toward the cover portion 100 through the sheet material 36a. The light (beam) R passes through the sheet material 36a and thereafter is reflected at a place where the hole is not formed in the cover portion 100. Thus, the light R first attenuates when the light R passes through the sheet material 36a and then is reflected by the cover portion 100, and thereafter further attenuates in the sheet material 36a and then travels to the outside through the sheet material 36a. For that reason, a color visually recognized by the user is blackish one.

The light T passes through the sheet material 36a and travels to the inside of the holes, such as 36b1 to 36b3, formed in the cover portion 100. For that reason, the inside of the hole is illuminated with the light T. Thereafter, the light T is reflected by the top surface of the IC card reader 61 and travels to the outside through the sheet material 36a. Also, in this case, the color visually recognized by the user is the blackish one. Accordingly, for the user, a boundary between the place where the hole is formed and the place where the hole is not formed is in conspicuous.

Here, if the sheet material 36a is not provided, both the light R and the light T reaches the top surface and the holes 36b1 to 36b3 of the cover portion 100 without being attenuated. However, the inside of the hole is shaded, and therefore, a blackish degree of the inside of the hole is larger than that of the top surface of the cover portion 100, so that the boundary between the place where the hole is formed and the place where the hole is not formed becomes conspicuous.

Part (b) of FIG. 12 is the sectional view for illustrating a state in which L embodiment emitted from the lighting portion 601 travels to the outside of the sheet material 36a through the sheet material 36a. As described above, the light entering the sheet material 36a from the outside of the sheet material 36a passes through the sheet material 36a two times consisting of (1) a period in which the light enters the sheet material 36a and then reaches the top surface of the cover portion 100 and (2) a period in which the light is reflected by the top surface of the cover portion 100 and then travels to the outside of the sheet material 36a through the sheet material 36a. On the other hand, the light emitted from the lighting portion 601 passes through the sheet material 36a only once and then travels to the outside of the sheet material 36a. Accordingly, the user is capable of visually recognizing sufficiently the light emitted from the lighting portion 601, through the sheet material 36a.

Using part (a) of FIG. 12, a structure of the sheet material 36a will be described. In this embodiment, the sheet material 36a is constituted by using a transparent layer (example of a first layer) 36a1 high in light transmittance and a semi-transparent print layer (example of a second layer) 36a2 printed on the transparent layer 36a1. A thickness of each of the transparent layer 36a1 and the print layer 36a2 is 0.5 mm. The sheet material 36a is applied onto the cover portion 100 with a double-side tape 36a3.

In this embodiment, polycarbonate is used as a material of the transparent layer 36a1, but another material such as acrylic resin may also be used. Here, for example, polycarbonate is excellent in impact resistance and heat resistance compared with acrylic resin. On the other hand, acrylic resin is not readily scarred compared with polycarbonate. In view of these advantage and disadvantage, the material of the transparent layer 36a1 may be determined.

The print plurality 36a2 has a function of diffusing the light passing through the print layer 36a2. Specifically, a function such that the incident light is diffused by subjecting the transparent layer 36a1 to printing with ink. By this, light transmittance is adjusted. As another constituting method of the print layer 36a2, for example, there is a method of diffusing the incident light by forming a dot pattern or the like. The incident light may also be diffused by mixing a diffusing (dispersing) agent such as polycarbonate.

Thus, by changing a mixing ratio of the diffusing agent such as polycarbonate, the light transmittance can be adjusted. For example, when the transmittance of the sheet material 36a as a whole is adjusted, the diffusing agent may also be mixed together with the transparent layer 36a1 which is the first layer and the print layer 36a2 which is the second layer. Incidentally, in this embodiment, the transparent layer 36a1 which is the first layer is higher in strength than the print layer 36a2 which is the second layer.

Here, the transmittance of the sheet material 36a is a value calculated from a ratio between a light quantity of the light entering the sheet material 36a and a light quantity of the outgoing light from the sheet material 36a. For example, when the light quantity of the light entering the sheet material 36a is L1 and the light quantity of the outgoing light from the sheet material 36a is L2, the transmittance is represented by a value which is a percentage of L2/1. Accordingly, when the light quantity L1 and the light quantity L2 can be acquired in a state in which a value of a current flowing through the LED is made constant, the transmittance of the sheet material 36a can be measured. As a calculating method of the transmittance of the sheet material 36a in this embodiment, for example, the following method exists.

For measurement of the light quantity of the light, an illuminance meter can be used. The illuminance meter displays the light, detected by using, for example, a photo-resistor or a photodiode, as a numerical value through an electric circuit in a digital manner. In this embodiment, for measurement of the transmittance of the sheet material 36a, a digital illuminance meter T-1M (manufactured by KONICA MINOLTA JAPAN, INC.) was used.

A measuring system in the case where the transmittance of the sheet material 36a is measured by using the illuminance meter is shown in parts (a1), (a2), (b1) and (b2) of FIG. 13. Part (a1) of FIG. 13 is a schematic view of the measuring system for measuring the light quantity (light quantity L1) of the light entering the sheet material 36a. First, in a state in which the sheet material 36a is not attached to the cover portion 100, a light receiving portion 500 of the illuminance meter is closely contacted to an edge of the hole 36b2 opposed to the lighting portion 601 of the IC card reader 61. In other words, the light receiving portion 500 of the illuminance meter is disposed on the surface of the hole 36b2, and the light quantity of the outgoing light from the lighting portion 601 is measured. At this time, a distance from the lighting portion 601 to the light receiving portion 500 of the illuminance meter is about 10 mm. In this state, the lighting portion 601 of the IC card reader 61 is turned on, and the light quantity is measured by the illuminance meter (light quantity L1). However, as regards the illuminance meter, a measurement error has to be considered in some cases depending on the distance between the lighting portion 601 and the light receiving portion 500. In the case where a gap is formed between the edge of the hole 36b2 and the light receiving portion 500 by increasing the distance between the light receiving portion 500 and the lighting portion 601, as shown in parts (b1) and (b2) of FIG. 13, the light quantity is measured while preventing leakage of the light emitted from the lighting portion 601 by closing this gap or the like.

Next, a method of measuring the light quantity of the light passed through the sheet material 36a will be described. Part (a2) of FIG. 13 is a schematic view of the measuring system for measuring the light quantity (light quantity L2) of the light passed through the sheet material 36a. In a state in which the sheet material 36a is attached to the cover portion 100, the light receiving portion 500 of the illuminance meter is brought near to the edge of the hole 36b2, through the sheet material 36a, opposed to the lighting portion 601 of the IC card reader 61. At this time, the light receiving portion 500 of the illuminance meter contacts the sheet material 36a, and between the lighting portion 601 and the hole 36b2, the sheet material 36a exists. In this state, the lighting portion 601 of the IC card reader 61 is turned on, and the light quantity is measured by the illuminance meter (light quantity L2). Also in this case, similarly as during measurement of the light quantity L1, in the case where a gap is formed between the light receiving portion 500 of the illuminance meter and the sheet material 36a, the light quantity is measured while covering the sheet material 36a so that the light passed through the sheet material 36a is not leaked to the outside from between the light receiving portion 500 and the sheet material 36a.

In the above-described manner, the transmittance of the sheet material 36a is calculated from the light quantity L1 and the light quantity L2 which are calculated. In this embodiment, as a light source of the lighting portion 601, an LED is used. In general, the LED includes various LEDs different in directivity, but even in the case where the LED with any directivity is used, when the same LED is used between when the light quantity L1 is measured and when the light quantity L2 is measured, the light quantity of the outgoing light through the opening opposed to the lighting portion 601 (LED) is the same between both the cases. Accordingly, in the case where the transmittance is measured by the above-described measuring method, the directivity of the LED does not matter.

Parts (b1) and (b2) of FIG. 13 are the schematic views for illustrating another measuring method for measuring the light quantity L1 and the light quantity L2. As described above, depending on a characteristic of the illuminance meter, there is a need to ensure a certain distance or more between the light receiving portion 500 of the illuminance meter and the lighting portion 601 is some cases. In these cases, as shown in parts (b1) and (b2) of FIG. 13, the light quantity is measured through a spacer 510, for example.

Part (b1) of FIG. 13 is the schematic view of the measuring system for measuring the light quantity L1 by using the spacer 510. The spacer 510 is a cylindrical member and is disposed so that an inside hollow portion is opposed to the hole 36b2. For that purpose, when a material of the spacer 510 is a material through which the light does not pass, the material may be simply prepared in a cylindrical shape by using the thick paper or the like and then may also be used in place of the spacer 510. One end of the spacer 510 is closely contacted to the edge of the hole 36b2, to the other end of the spacer 510, the light receiving portion 500 of the illuminance meter is closely contacted, so that the outgoing light from the lighting portion 601 is measured.

Part (b2) of FIG. 13 is the schematic view of the measuring system for measuring the light quantity L2 by using the spacer 510. One end of the spacer 510 is closely contacted to the surface of the sheet material 36a opposed to the edge of the hole 36b2, and to the other end of the spacer 510, the light receiving portion 500 of the illuminance meter is closely contacted, so that the light emitted from the lighting portion 601 and passed through the sheet material 36a can be measured through the spacer 510. The transmittance of the sheet material 36a is measured by using the light quantity L1 and the light quantity L2 which were measured in the above-described manner. Incidentally, in this embodiment, the transmittance of the sheet material 36a was measured by using the light emitted from the lighting portion 601 in this embodiment, but if attention is paid so that the distance from the light source to the surface of the hole 36b2 is not different between during the measurement of the light quantity L1 and during the measurement of the light quantity L2, a portion other than the lighting portion 601 of the IC card reader 61 may also be used as the light source. For example, an LED provided on a substrate is covered with the cover portion 100, and then the light quantity may also be measured by a method similar to the above-described method.

The print layer 36a2 in this embodiment is set so that the transmittance of visible light passing through the sheet material 36a is about 10%. This value is measured under an environment of 28° C. in temperature and 40% RH in relative humidity. Here, the visible light is defined as light of 400 nm or more and 700 nm or less in wavelength. Further, the light transmittance is defined as a ratio of the light quantity of the outgoing light through the sheet material 36a to the light quantity of the light entering the sheet material 36a. Accordingly, irrespective of the light quantity entering the sheet material 36a, the transmittance of the sheet material 36a is approximately constant.

Here, in the case where the transmittance of the sheet material 36a is high, most of the light entering the sheet material 36a from the outside of the sheet material 36a readies the cover portion 100. Thus, the boundary between the top surface of the cover portion 100 where the holes are not formed and the holes which are shaded and which are blackish portions becomes conspicuous, so that a quality of outer appearance lowers. Specifically, when the light transmittance of the sheet material 36a exceeds 25%, a difference between the light quantity of the light reflected in a region other than the portion of the top surface of the cover portion 100 in which the holes 36a1 to 36b3 are formed and the light quantity of the light reflected from shaded inside portions of the holes 36b1 to 36b3 becomes conspicuous. Thus, when the transmittance of the sheet 36a is made higher than 25%, the light quantity of the light reflected by the top surface of the cover portion 100 becomes large, so that the plurality of the holes formed in the cover portion 100 becomes conspicuous. When the print layer 36a2 is formed so that the light transmittance of the sheet material 36a is 25% or less, of the light entering the sheet material 36a from the outside of the sheet material 36a, the light reaching the cover portion 100 can be decreased in transmittance to 25% or less, and in addition, the light reflected by the cover portion 100 is also decreased in transmittance to 25% or less through the sheet material 36a and thereafter travels to the outside of the sheet material 36a. Accordingly, of the light entering the sheet material 36a from the outside of the sheet material 36a, the light travelling to the outside of the sheet material 36a through the sheet material 36a is about 6 to 7%. When the light is attenuated to this degree, a color tint of the inside of the holes and a color tint of the top surface of the cover portion are the same degree, so that it is possible to prevent the plurality of holes 36b1 to 36b8 of the cover portion 100 from becoming conspicuous through the sheet material 36a.

On the other hand, when the transmittance of the sheet material 36a is set at an excessively low value, visibility of the light emitted from the lighting portion 601 of the IC card reader 61 lowers. Specifically, when the print layer 36a2 is formed so that the transmittance of the sheet material 36a is less than 5%, the lighting portion 601 which comes on when the sheet material 36a is seen from the outside of the sheet material 36a is not readily seen. As shown in part (b) of FIG. 12, the light emitted from the lighting portion 601 passes through the hole 36b2 of the cover portion 100 and then travels to the outside of the sheet material 36a through the print layer 36a2 and the transparent layer 36a1. At this time, if the print layer 36a2 is formed so that the transmittance of the sheet material 36a becomes less than 5%, of the light emitted from the lighting portion 601, the light travelling to the outside of the sheet material 36a is less than 5% in transmittance. At the light quantity to this degree, it is difficult for the operator to recognize the light of the lighting portion 601.

From the above, the print layer 36a2 is formed so that the transmittance of the sheet material 36a is 5% or more and 25% or less. By setting the transmittance of the sheet material 36a at a value of this range, it is possible to prevent the plurality of holes 36b1 to 36b8 to become conspicuous while ensuring easy visibility of the lighting portion 601 by the operator such as the user. Incidentally, in this embodiment, by forming the print layer 36a2 on the transparent layer 36a1, the transmittance of the sheet material 36a was set at 5% or more and 25% or less, but this embodiment is not limited thereto. For example, the sheet material 36a is constituted only by the transparent layer 36a1, and then the transmittance may also be adjusted by adjusting a ratio of the diffusing agent such as polycarbonate forming the transparent layer 36a1. Further, there is no limit to the number of layers constituting the sheet material 36a, but it is only required that the transmittance of the single sheet material 36a is 5% or more and 25% or less. In this embodiment, the transparent layer 36a1 permits transmission of the light of 90% or more in transmittance and is excellent in strength. On the sheet including such a layer, the print layer 36a2 filled with the diffusing agent is formed, whereby it is possible to obtain a target transmittance while enhancing the strength of the sheet material 36a.

(Color Tint of Sheet Material)

Next, the color tint of the sheet material 36a in this embodiment will be described. The color tint of the sheet material 36a in this embodiment is blackish gray, but the color (tint) is not limited to the gray but may also be milk white. Also, by making the color of the sheet material 36a the same as the color of the cover portion 100, it is possible to suppress that the holes 36b1 to 36b8 become conspicuous.

In general, for expression of the color tint of a substance (object), a color system which is called L*a*b* color space is used in some instance. The L*a*b* is standardized by CIE (Commision Internationale de l'Eclairage) and is a color system also employed in JIS (JIS Z 8781-4) in Japan. In L*a*b* color space, lightness is represented by L*, chromaticity indicating (color) hue is represented by a*, and chromaticity indicating (color) saturation is represented by b*. In the L*a*b* color space, a* and b* show directions of color, in which a* indicates a read direction, —a* indicates a green direction, b* indicates a yellow direction, and —b* indicates a blue direction. With an increasing numerical value, the color becomes clear, and as the numerical value approaches a center value, the color becomes dull-color.

Further, when the color of the light emitted from the sheet material 36a is measured through the sheet material 36a by the L*a*b* color space, the print to layer 36a2 may preferably be formed so that the lightness L* is 5 or more and 25 or less. The hole 36a1 and the holes 36a3 to 36b8 are shaded on the inside thereof and are in a state in which the lightness is low. For that reason, when the lightness L* exceeds 25, a lightness difference is formed between the holes 36b1 and 36b3 to 36b8 and regions other than these holes, so that the holes becomes conspicuous. In this embodiment, when the color tint of the light emitted from the sheet material 36a is measured, the lightness L* is 10. Further, when the color of the cover portion 100 is a gray system color lower in reflectance than white, and is 0 or more and 50 or less in L* when the color of the cover portion 100 is represented by the CIE1976L*a*b* color space. By doing so, the color of the sheet material 36a and the color of the cover portion 100 becomes the same system color tint, so that the plurality of holes formed in the cover portion 100 can be prevented from becoming conspicuous.

Further, the print layer 36a2 may preferably be formed so that the color hue a* is about 1 and the color saturation b* is about 5. By making the color of the print layer 36a2 a relatively dark color tint, it is possible to prevent the hole 36b1 and the holes 36b3 to 36b8 from becoming conspicuous.

In part (a) of FIG. 12, in the case where a portion of the top surface of the cover portion where the holes 36b1 to 36b8 are not formed, for example, a portion where the light R is reflected by the portion is seen from the front side, the operator (user) sees the portion through the print layer 36a2 of the sheet material 36a. The color of the cover portion 100 is the black system color, and the color of the sheet material 36a is the gray system color, so that both the colors of these portions are the same system color, and therefore, a difference in color tint between both the portions is in conspicuous.

Further, in the case where a portion in which the holes 36b1 to 36b8 are formed, for example, a portion through which the light T passes is seen from the front side, the print layer 36a2 is the gray system color and is low in transmittance, and therefore, the holes 36b1 to 37b8 are in conspicuous. Further, the holes 36b1 to 36b8 are small holes of about 5 mm in diameter, so that these holes are shaded by ambient light. The inside of the holes 36b1 to 36b8 is a dark space, and therefore, a difference in color tint from the black system color of the cover portion 100 becomes small. Incidentally, as regards the shape of the holes 36b1 to 36b8, any shape such as a circle or a rectangle may be used.

Modified Embodiment

The sheet material 36a in the embodiment described above was formed by the two layers consisting of the transparent layer 36a1 and the print layer 36a2. A sheet material 36a according to a modified embodiment is also constituted by a transparent layer and a print layer, but the print layer in this modified embodiment is constituted by a first print layer 36a21 and a second print layer 36a22. Incidentally, portions represented by the same reference numerals or symbols as those of the above-described embodiment have the substantially same constitutions as those of the embodiment, and therefore, will be omitted from description. FIG. 14 is a schematic view for illustrating the sheet material 36a in this modified embodiment.

The first print layer 36a21 is the same as the print layer 36a2 in the above-described embodiment. That is, into the print layer in this modified embodiment, the second print layer 36a22 is added. The second print layer 36a22 is formed of a material in which a milky-white diffusing agent is mixed. By mixing the diffusing agent, a part of incident light is refracted, so that the light is diffused.

A double-side tape 36a3 is provided at a non-overlapping position with the holes 36b1 to 36b8 in the case where the double-side tape 36a3 is applied onto a cover covering the IC card reader. The double-side tape 36a3 is provided at an outer peripheral end portion of the sheet material 36a, so that an effect of suppressing end portion floating of the sheet material 36a is achieved.

As a feature of this modified embodiment, the second print layer 36a22 including the diffusing agent, and therefore, when the sheet material 36a is seen from the front side, boundary portions of edges of the holes 36b1 to 36b8 blur due to diffusion of the light, and therefore, the holes 36b1 to 36b8 become more in conspicuous.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-210866 filed on Nov. 21, 2019, which is hereby incorporated by reference herein in its entirety.

What is claimed is:
1. An image forming apparatus comprising:
an image forming portion configured to form an image on a sheet;
a mounting portion on which an IC card reader which includes a lighting portion where light indicating an operation state comes on and which is used for user authentication is mounted;
a reader cover mounted on said mounting portion and covering said IC card reader, wherein said reader cover is provided with a plurality of openings, either one of said openings opposing said lighting portion of said IC card reader; and
a light transmission sheet provided on said reader cover and covering said openings, wherein transmittance of visible light for said light transmission sheet is 5% or more and 25% or less.

2. An image forming apparatus according to claim 1, further comprising a display portion configured to display information on image formation,
wherein said mounting portion is provided adjacent to said display portion with respect to a widthwise direction perpendicular to both a vertical direction and a front-rear direction of said image forming apparatus.

3. An image forming apparatus according to claim 2, wherein said mounting portion is positioned on a right side of said display portion when a user being opposed to and operating said display portion sees said image forming apparatus.

4. An image forming apparatus according to claim 2, wherein said display portion is mounted on a frame of said image forming apparatus so as to be rotatable relative to the frame on a front side of said image forming apparatus, and an axial direction of the rotation is parallel to the widthwise direction.

5. An image forming apparatus according to claim 1, wherein said reader cover is provided with three or more openings for being opposed to said lighting portion of said IC card reader mounted on the mounting portion.

6. An image forming apparatus according to claim 1, wherein when a to surface of said reader cover is divided into two equal regions with respect to a direction perpendicular to a widthwise direction perpendicular to a front-rear direction of the image forming apparatus, in each of the divided two equal regions, a least one opening is provided.

7. An image forming apparatus according to claim 1, wherein said light transmission sheet is a single sheet-like member, and a thickness of said light transmission sheet is thinner than a thickness of said reader cover.

8. An image forming apparatus according to claim 7, wherein said light transmission sheet includes a first layer and a second layer with respect to a thickness direction thereof, said first layer being higher in transmittance and intensity of visible light than said second layer.

9. An image forming apparatus according to claim 8, wherein said second layer contains polycarbonate as a material thereof.

10. An image forming apparatus according to claim 1, wherein said light transmission sheet is mounted on a surface of said reader cover opposite from a side where said mounting portion is positioned.

11. An image forming apparatus according to claim 1, wherein said IC card reader is mounted on said mounting portion through a sponge.

12. An image forming apparatus according to claim 1, wherein said reader cover is applied to said IC card reader, with a double-side tape, mounted on said mounting portion.

13. An image forming apparatus according to claim 1, further comprising:

a sheet accommodating portion mounted so as to be capable of being pulled out of said image forming apparatus and configured to accommodate sheets; and an image reading apparatus configured to read an image from an original, wherein said mounting portion is provided on a side downstream of said image reading apparatus with respect to a pulling-out direction of said sheet accommodating portion.

14. An image forming apparatus according to claim 13, wherein with respect to the pulling-out direction, between said image reading apparatus and said mounting portion, a USB port for supplying electric power to said IC card reader is provided.

15. An image forming apparatus according to claim 1, wherein said light transmission sheet is applied to said reader cover with a double-side tape.

16. An image forming apparatus according to claim 1, wherein said light transmission sheet is 5 or more and 25 or less in L* in a color space of L*a*b* and is colored gray lower in reflectance than white, and wherein said reader cover is 0 or more and 50 or less in L* in the color space of L*a*b* and is colored gray lower in reflectance than white.

* * * * *